(12) United States Patent
Li et al.

(10) Patent No.: US 8,936,267 B2
(45) Date of Patent: Jan. 20, 2015

(54) COLLAPSIBLE CHILD CARRIER APPARATUS

(75) Inventors: Jian Qun Li, Central Hong Kong (HK); Haibo Zeng, Central Hong Kong (HK)

(73) Assignee: Wonderland Nurserygoods Company Limited, Hong Kong (HK)

(*) Notice: Subject to any disclaimer, the term of this patent is extended or adjusted under 35 U.S.C. 154(b) by 175 days.

(21) Appl. No.: 13/602,376

(22) Filed: Sep. 4, 2012

(65) Prior Publication Data

US 2013/0240577 A1 Sep. 19, 2013

(30) Foreign Application Priority Data

Sep. 5, 2011 (CN) .......................... 2011 1 0270033
Aug. 9, 2012 (CN) .......................... 2012 1 0282891

(51) Int. Cl.
A47D 1/06 (2006.01)
A47D 11/00 (2006.01)
B62B 7/12 (2006.01)
B62B 7/00 (2006.01)
B62B 7/08 (2006.01)

(52) U.S. Cl.
CPC ... B62B 7/00 (2013.01); B62B 7/08 (2013.01); B62B 2205/20 (2013.01)
USPC .............................. 280/642; 280/30; 297/118

(58) Field of Classification Search
None
See application file for complete search history.

(56) References Cited

U.S. PATENT DOCUMENTS

| | | | |
|---|---|---|---|
| 4,765,645 A * | 8/1988 | Shamie | 280/644 |
| 6,102,431 A | 8/2000 | Sutherland et al. | |
| 7,118,121 B2 | 10/2006 | Cheng et al. | |
| 7,296,820 B2 | 11/2007 | Valdez et al. | |
| 7,422,230 B2 | 9/2008 | Chuan | |
| 2004/0222615 A1 | 11/2004 | Cheng et al. | |
| 2005/0098983 A1 | 5/2005 | Cheng et al. | |
| 2006/0088368 A1 | 4/2006 | Chen | |
| 2006/0214397 A1 * | 9/2006 | Dotsey et al. | 280/647 |
| 2009/0289478 A1 * | 11/2009 | Piserchio | 297/118 |

FOREIGN PATENT DOCUMENTS

| | | |
|---|---|---|
| CA | 2085179 A1 | 6/1994 |
| DE | 202004016019 U1 | 4/2005 |
| EP | 1069022 A1 | 1/2001 |
| EP | 1591338 A2 | 2/2005 |
| GB | 2278633 A | 12/1994 |
| JP | 5848387 A | 10/1983 |
| JP | 200715587 A | 1/2007 |
| JP | 2010528923 A | 8/2010 |
| WO | 2010040644 A1 | 4/2010 |

* cited by examiner

*Primary Examiner* — J. Allen Shriver, II
*Assistant Examiner* — Hilary L Johns
(74) *Attorney, Agent, or Firm* — David I. Roche; Baker & McKenzie LLP

(57) ABSTRACT

A child carrier apparatus comprises first and second leg frames, a seat frame including first and second tube portions, a joint housing connected with the first and second tube portions, an impeding part assembled adjacent to the joint housing, and a release actuator. The first tube portion is pivotally connected with the first leg frame. The second tube portion is pivotally connected with the second leg frame and the joint housing, and is rotatable between unfolded and folded positions. The impeding part can move between a first position obstructing rotation of the second tube portion relative to the joint housing from the unfolded position, and a second position displaced away from a path of rotation of the second tube portion to allow folding of the second tube portion. The release actuator is operable to drive the impeding part to move from the first to second position.

40 Claims, 42 Drawing Sheets

COLLAPSIBLE CHILD CARRIER APPARATUS

CROSS-REFERENCE TO RELATED APPLICATIONS

This application claims priority to Chinese Patent Application No. 201110270033.4 filed on Sep. 5, 2011, and to Chinese Patent Application No. 201210282891.5 filed on Aug. 9, 2012.

BACKGROUND

1. Field of the Invention

The present inventions relate to collapsible child carrier apparatuses.

2. Description of the Related Art

Most infant stroller apparatuses have a frame structure that can be collapsed into a compact size to allow convenient storage. Typically, a release mechanism provided at the handle of the stroller has to be operated to unlock the frame structure. Thereafter, the handle can be manually rotated to drive folding of the frame structure. This conventional approach results in a frame structure that may be relatively complex, and requires non-negligible effort to drive folding. Moreover, there may be some risks that the caregiver's hand becomes clamped in the frame structure when folding the stroller apparatus.

Therefore, there is a need for child carrier apparatuses that can be collapsed in a convenient manner, and address at least the foregoing issues.

SUMMARY

The present application describes child carrier apparatuses that can be conveniently collapsed. Examples of the child carrier apparatuses can include, without limitation, stroller apparatuses and high chair apparatuses.

In some embodiment, a child carrier apparatus comprises a first and a second leg frame, a seat frame assembled with the first and second leg frames and including a first and a second tube portion, a joint housing connected with the first and second tube portions, an impeding part assembled adjacent to the joint housing, and a release actuator operatively connected with the impeding part. The first tube portion is pivotally connected with the first leg frame, and the second tube portion is pivotally connected with the second leg frame and the joint housing, the second tube portion being rotatable relative to the joint housing between an unfolded position and a folded position. The impeding part is movable between a first position where the impeding part obstructs rotation of the second tube portion relative to the joint housing from the unfolded position, and a second position where the impeding part is displaced away from a path of rotation of the second tube portion relative to the joint housing and the first tube portion to allow folding of the second tube portion. The release actuator is operable to drive the impeding part to move from the first position to the second position.

DETAILED DESCRIPTION OF THE EMBODIMENTS

The present application describes collapsible child carrier apparatuses adapted to receive a child in a sitting position. The child carrier apparatus can include a seat frame, and frame locking structures assembled with the seat frame. The frame locking structures can be connected with a release actuator that is operable to unlock the frame locking structures and trigger self-folding of the child carrier apparatus to a collapse state. In some embodiment, safety lock devices can also be provided in association with the frame locking structures. The safety lock device can have a locking or disable state in which inadvertent unlocking of the associated frame locking structure is prevented, and an unlocking or enabling state in which unlocking of the associated frame locking structure is enabled. Accordingly, the child carrier apparatus can be safer in use. Examples of the child carrier apparatuses can include, without limitation, stroller apparatuses and high chair apparatuses.

Figure 1:
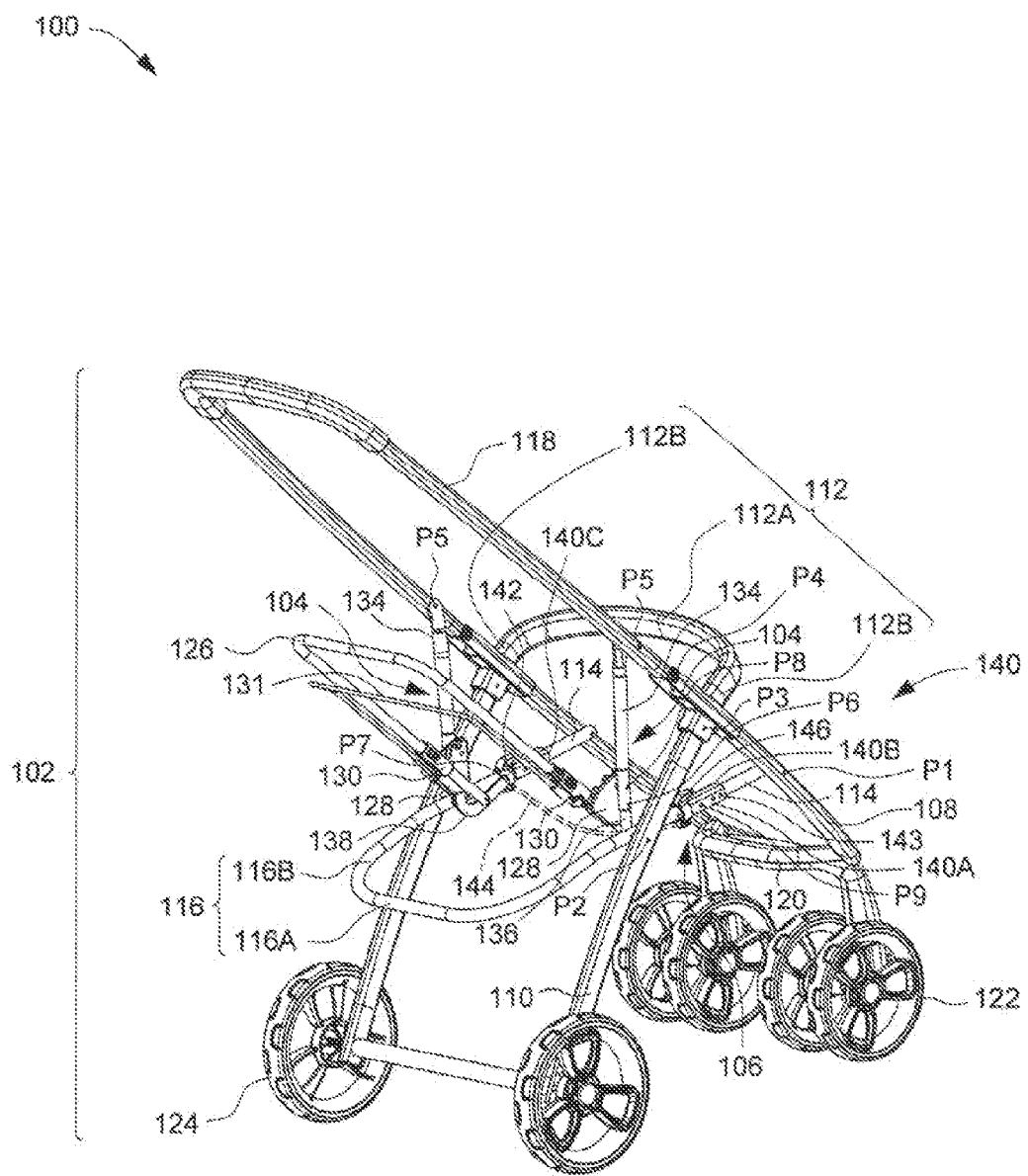
FIGS. 1 and 2 are perspective views illustrating an embodiment of a collapsible stroller apparatus.
Figure 2:
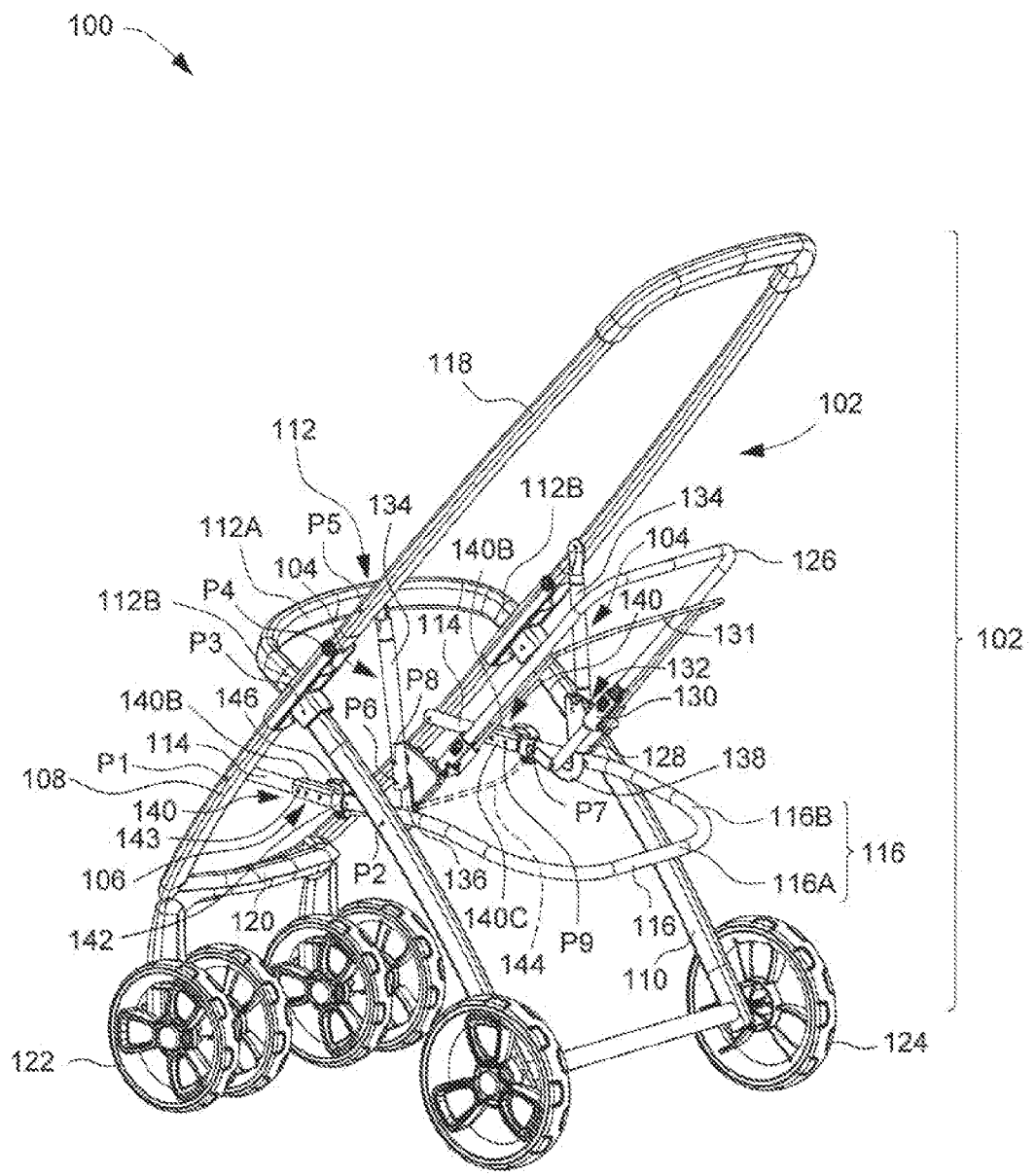

FIGS. 1 and 2 are perspective views illustrating an embodiment of a collapsible stroller apparatus 100. The stroller apparatus 100 can include a support frame 102. Linkage structures 104 and frame locking structures 106 can be respectively disposed at the left and right sides of the support frame 102 in a symmetric manner. A release actuator 144 can be operatively connected with the frame locking structures 106. The release actuator 144 may be operable to switch the frame locking structures 106 from a locking state where the support frame 102 is held in an unfolded state, to an unlocking state where the support frame 102 can be folded to a collapse state. The release actuator 144 can be exemplary formed as a strap made of a webbing material that extends across the width of a seat portion of the stroller apparatus 100.

The support frame 102 can include a first leg frame 108, a second leg frame 110, an armrest 112, a seat frame comprised of two first tube portions 114 and a U-shaped second tube portion 116, and a U-shaped handle 118. The construction and assembly of the first leg frame 108, second leg frame 110, armrest 112, seat frame and handle 118 can be substantially symmetric.

The armrest 112 can include a transverse portion 112A, and two side segments 112B respectively connected with the left and right ends of the transverse portion 112A. The armrest 112 can be formed as an integral body that has the side segments 112B respectively assembled with the first and second leg frames 108 and 110, and the handle 118.

A lower end portion of the first leg frame 108 can be assembled with a footrest board 120, and can be provided with front wheels 122. The first leg frame 108 can have two upper ends respectively affixed with the side segments 112B of the armrest 112.

The second leg frame 110 can have two lower ends respectively mounted with rear wheels 124. The second leg frame 110 can be pivotally connected with the two side segments 112B of the armrest 112 via two connection shafts P3. When the support frame 102 is unfolded for use, the first tube portions 114 can lie parallel and at least partially aligned with the ends of the side segments 116B of the second tube portion 116.

The seat frame comprised of the first and second tube portions 114 and 116 can be pivotally assembled with the first and second leg frames 108 and 110. The first tube portions 114 can be two tubular segments disposed at the left and right sides of the support frame 102. Each first tube portion 114 can be pivotally connected with a side segment of the first leg frame 108 via a connection shaft P1 located under the armrest 112.

The second tube portion 116 can be disposed adjacent to a rear of the first tube portions 114, and can be pivotally assembled with the two first tube portions 114 via joint housings 140. The second tube portion 116 can have a U-shape including a transverse segment 116A, and left and right side segments 116B respectively connected with opposite sides of the transverse segment 116A. Each side segment 116B of the second tube portion 116 can be pivotally connected with a side segment of the second leg frame 110 via a connection shaft P2. When the stroller apparatus 100 is unfolded for use, parts of the first and second tube portions 114 and 116 adjacent to each joint housing 140 may extend substantially parallel and aligned with each other.

The handle 118 can have lower ends pivotally connected with the side segments 112B of the armrest 112 via connection shafts P4. The connection shafts P4 can be located above the connection shafts P3. The connection shafts can be formed by any elements such as pins, rivets and the like.

The support frame 102 can also include a U-shaped backrest frame 126, and two backrest holding brackets 128. The backrest frame 126 can have two lower ends pivotally connected with inner side surfaces of the second tube portion 116, such that the second tube portion 116 is disposed between the backrest frame 126 and the second leg frame 110. In addition, the two side segments of the backrest frame 126 can be respectively assembled with two latches 130 that are connected with a release actuator 131. In one embodiment, the release actuator 131 can be exemplary a rod having a U-shape. A surface of each holding bracket 128 can include a plurality of locking grooves 132 (better shown in FIG. 3) that are distributed on different radial directions relative to the pivot axis of the backrest frame 126. Each of the two latches 130 can movably engage with any of the locking grooves 132 of the associated holding bracket 128 to lock the backrest frame 126 at a desired inclination, and disengage from the locking grooves 132 for adjustment when the release actuator 131 is pulled upward.

Each of the linkage structures 104 can include first and second rod segments 134 and 136, and a L-shaped linkage 138. The first rod segment 134 can have an upper end pivotally connected with one side segment of the handle 118 via a connection shaft P5 located above the connection shaft P4. The first rod segment 134 can also have a lower end pivotally connected with an upper end of the second rod segment 136 via a connection shaft P6. The second rod segment 136 can have a lower end respectively connected pivotally with the second tube portion 116 and the second leg frame 110 via the connection shaft P2. The L-shaped linkage 138 can have a first end pivotally connected with the second tube portion 116 via a connection shaft P7, and a second end that is inserted through an interior of the holding bracket 128 from the underside and pivotally connects with the first rod segment 134 and the holding bracket 128 via a connection shaft P8. The connection shaft P8 can be assembled above the connection shaft P6. Accordingly, the first rod segment 134 can be pivotally connected with the L-shaped linkage 138 and the holding bracket 128 via the connection shaft P8.

Figure 3:
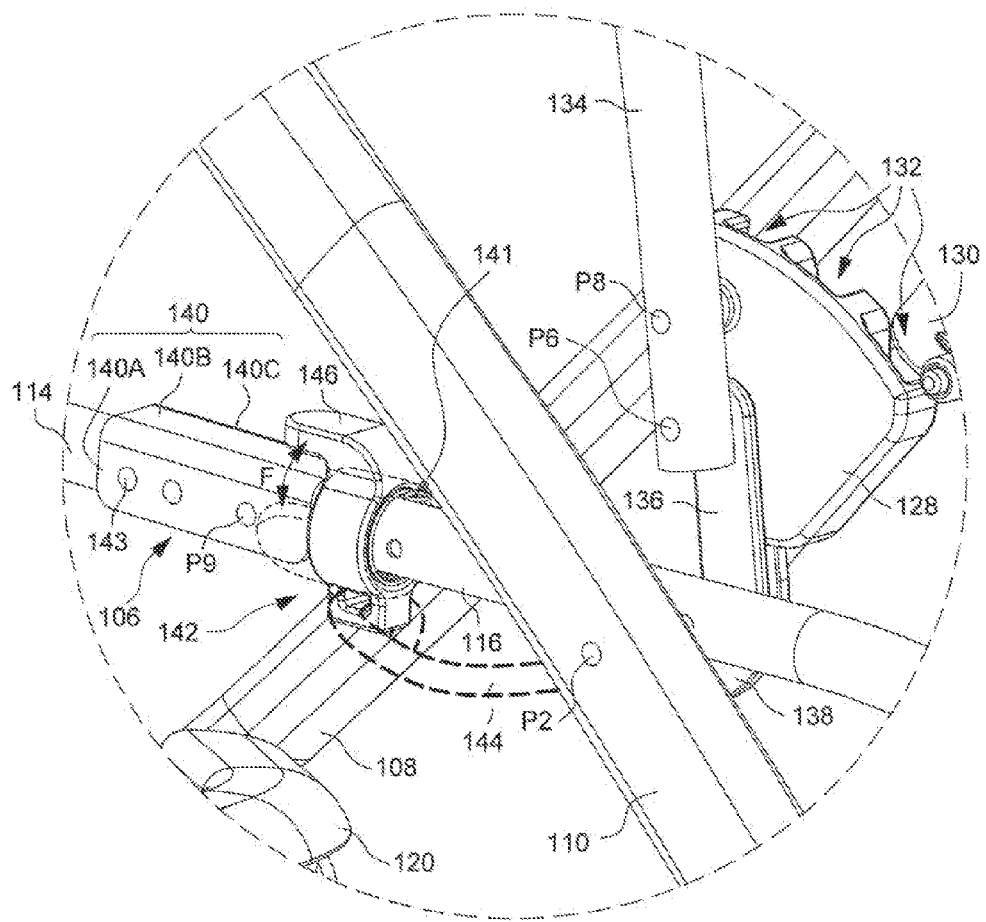
FIG. 3 is an enlarged view illustrating one of two frame locking structures implemented in the stroller apparatus shown in FIG. 1.
Figure 4:
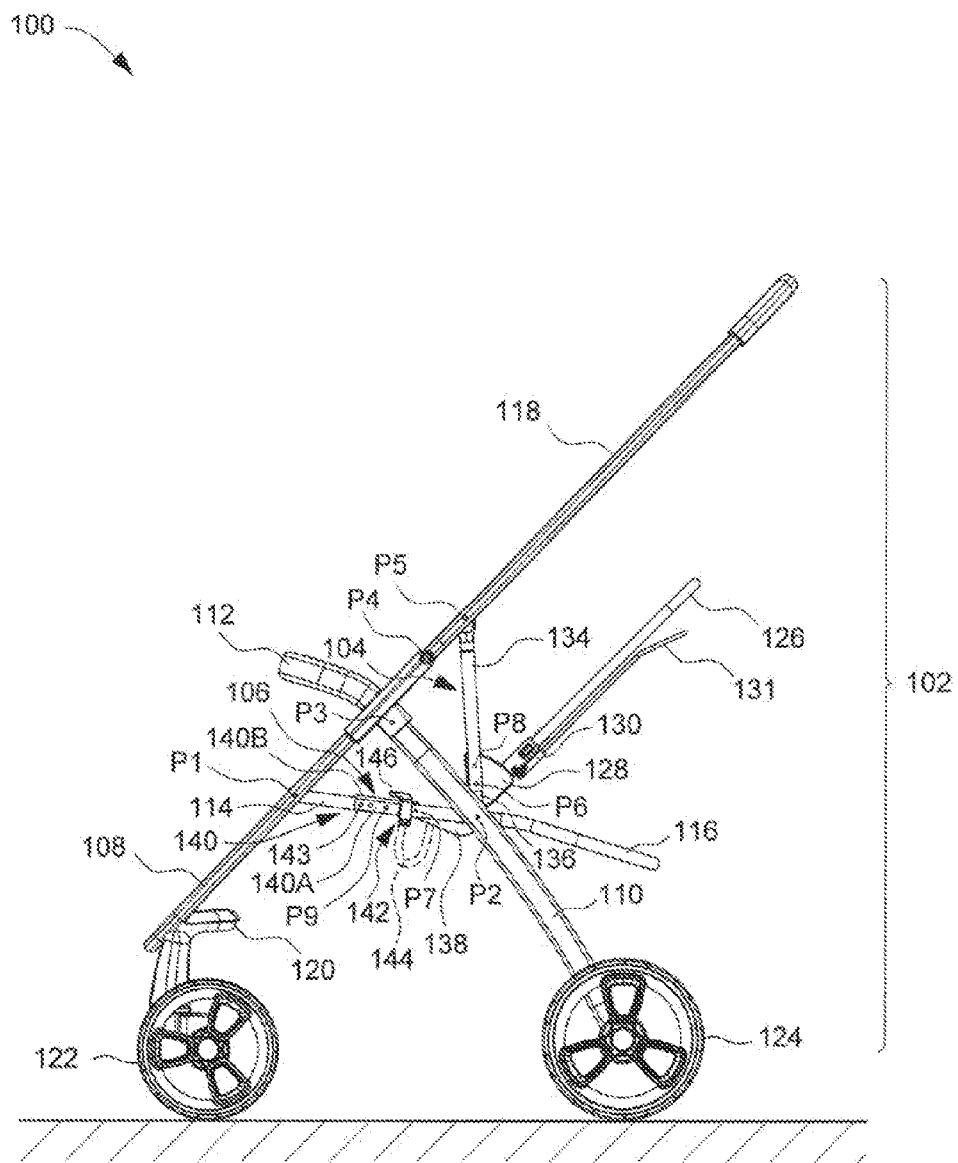
FIG. 4 is a side view of the stroller apparatus shown in FIG. 1.

FIG. 3 is an enlarged view illustrating one of the two frame locking structures 106 shown in FIG. 1, and FIG. 4 is a side view of the stroller apparatus 100. The two frame locking structures 106 can be similar in construction and operation, and are respectively disposed at the left and right sides to selectively lock each first tube portion 114 with the second tube portion 116 in an unfolded state. In the illustrated embodiment, the frame locking structure 106 can be located generally between the connection shafts P1 and P2, and below the connection shaft P3. Each frame locking structure 106 can include a joint housing 140 and an impeding part 142. The joint housing 140 can have a U-shape including a first sidewall 140A, a transversal wall 140B, and a second sidewall 140C. The first and second sidewalls 140A and 140C can be substantially parallel and facing each other, and the transversal wall 140B can be connected with upper ends of the first an second sidewalls 140A and 140C. Each joint housing 140 can receive the assembly of one first tube portion 114 and one side segment 116B of the second tube portion 116 adjacently to each other. More specifically, the first tube portion 114 can be affixed via a fastener 143 with the joint housing 140 in a gap between the sidewalls 140A and 140C, whereas the side segment 116B of the second tube portion 116 can be pivotally connected with the joint housing 140 in the gap between the sidewalls 140A and 140C via a connection shaft P9.

As shown, the impeding part 142 can disposed adjacent to the joint housing 140 at a position between the connection shafts P7 and P9. The impeding part 142 can be pivotally assembled around one side segment 116B of the second tube portion 116, and have an underside attached with the release actuator 144. Accordingly, the impeding part 142 can rotate around the side segment 116B about a pivot axis that can be substantially perpendicular to the connection shaft P9.

The impeding part 142 can be formed as a collar including an extension 146 that projects substantially parallel to the pivot axis of the impeding part 142 to overlap with the joint housing 140. The impeding part 142 can be operable to rotate around the side segment 116B (as shown by the double arrow F in FIG. 3) between two positions: a locking position where the extension 146 is adjacently facing the transversal wall 140B and obstructs a path along which the joint housing 140 and the first tube portion 114 rotationally move relative to the second tube portion 116 during folding, and an unlocking position where the extension 146 is facing the sidewall 140A and is lying outside the path of displacement of the joint housing 140 and the first tube portion 114 relative to the second tube portion 116.

A torsion spring 141 can be assembled between an inner surface of the impeding part 142 and the side segment 116B of the second tube portion 116. The torsion spring 141 can be operable to rotationally bias the impeding part 142 toward the locking position for blocking rotation of the second tube portion 116 about the connection shaft P9.

When the impeding part 142 is in the locking position, the transversal wall 140B of the joint housing 140 is located between the side segment 116B of the second tube portion 116 and the extension 146 of the impeding part 142. As a result, rotation of the second tube portion 116 relative to the first tube portions 114 in the unfolding direction can be blocked owing to the abutment between the extension 146 and the transversal wall 140B of the joint housing 140. The first tube portions 114 and the second tube portion 116 can accordingly be kept aligned with and parallel to each other at least near the joint housings 140. The frame locking structure 106 can thereby hold the stroller apparatus 100 in the unfolded state for use.

When the impeding part 142 is in the unlocking position, the extension 146 can disengage from the upper side of the transversal wall 140B and face the sidewall 140A. The impeding part 142 thereby can clear away from a path of rotation of the second tube portion 116 relative to the joint housing 140 and the first tube portion 114. With the impeding part 142 in the unlocking state, the second tube portion 116 can rotate about the connection shaft P9 relative to the first tube portion 114 and the joint housing 140 for folding the stroller apparatus 100.

While the embodiment described above is provided with two frame locking structures 106 at the left and right sides, alternate embodiments may possibly implement one single frame locking structure 106 to lock and unlock the support frame 102. Moreover, it is worth noting that the position where the joint housing 140 is assembled may be interchanged with that of the impeding part 142 without affecting the function and operation of the frame locking structure 106. For example, the side segment 116B of the second tube portion 116 can be affixed with the joint housing 140, whereas the impeding part 142 can be assembled around the first tube portion 114 which is pivotally connected with the joint housing 140.

Figure 5:
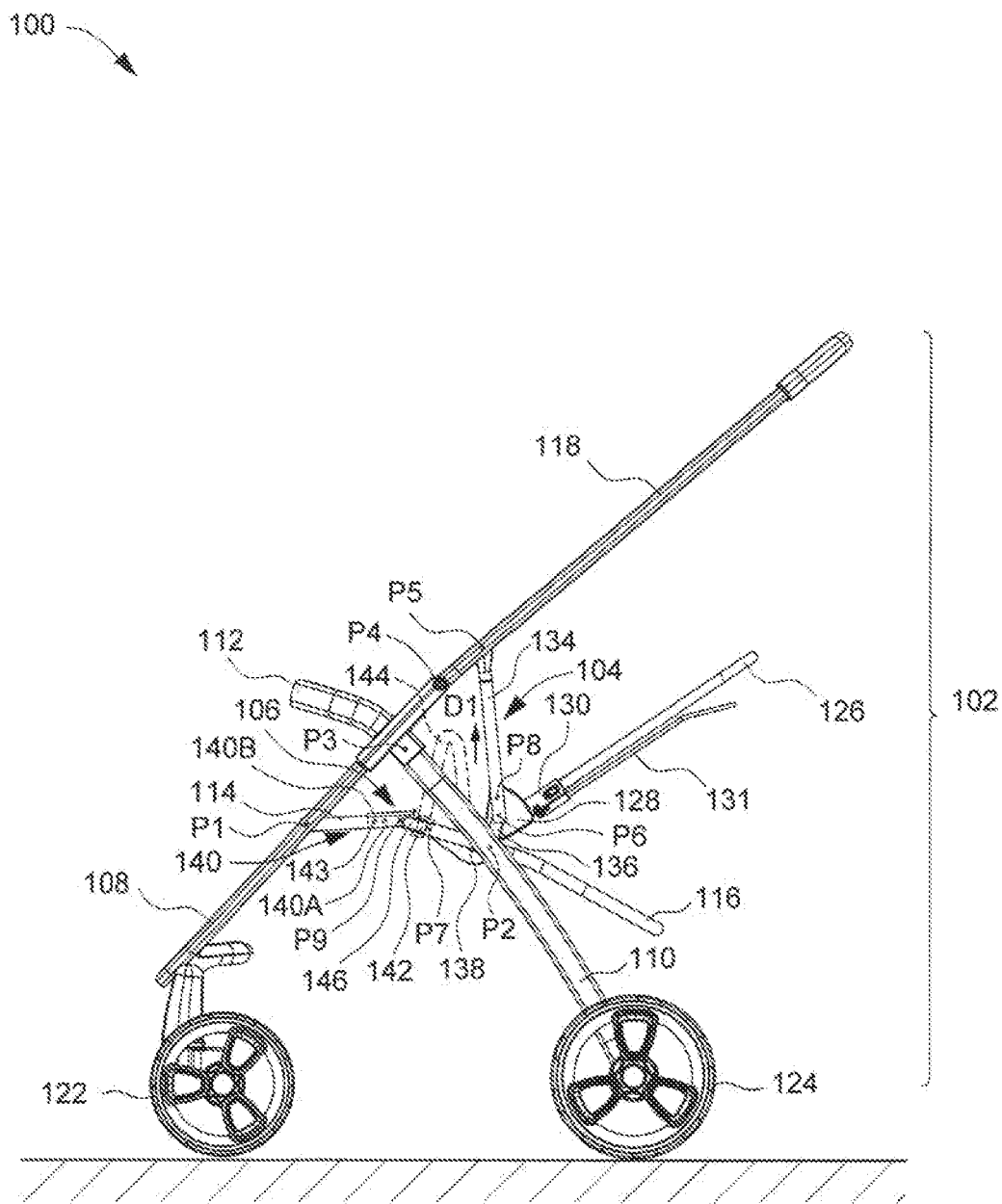
FIGS. 5-7 are schematic views illustrating a folding operation of the stroller apparatus shown in FIG. 1.
Figure 6:
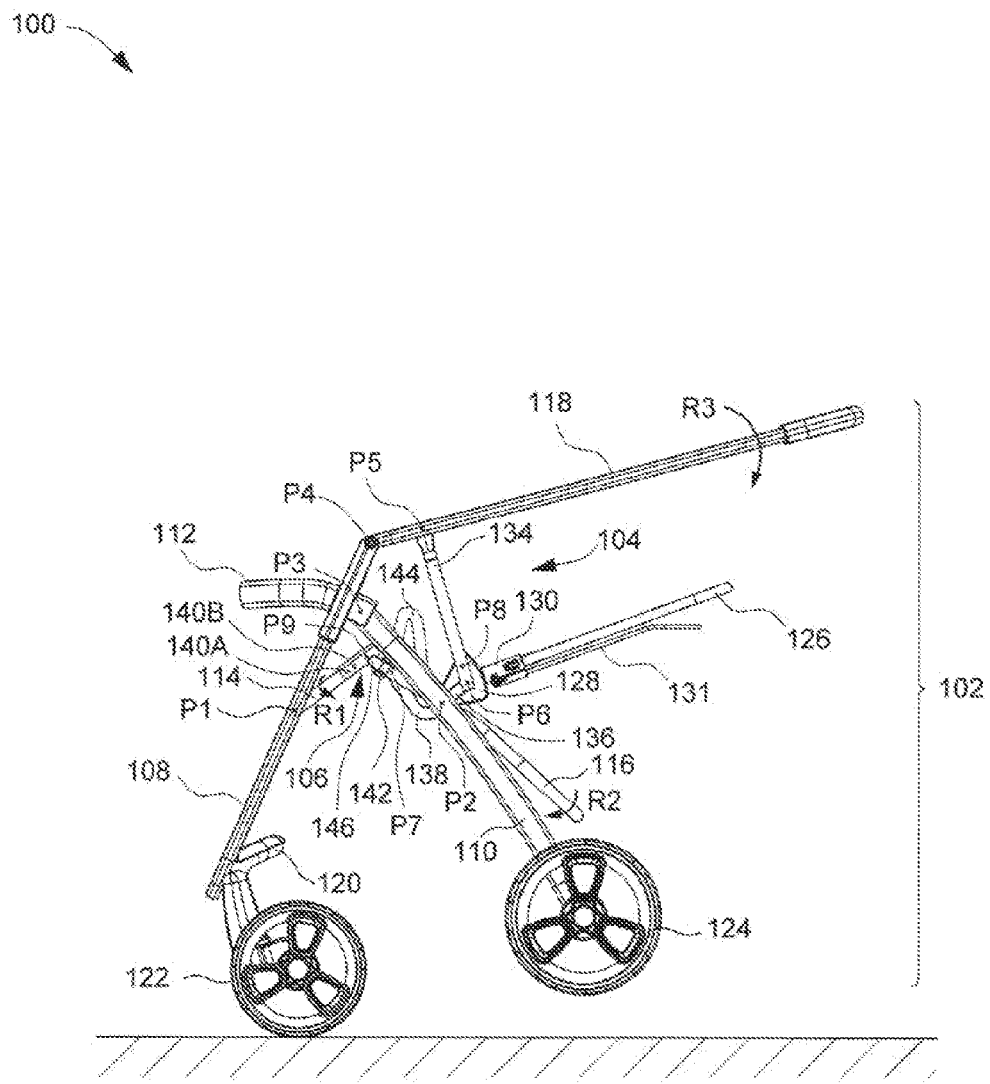
Figure 7:
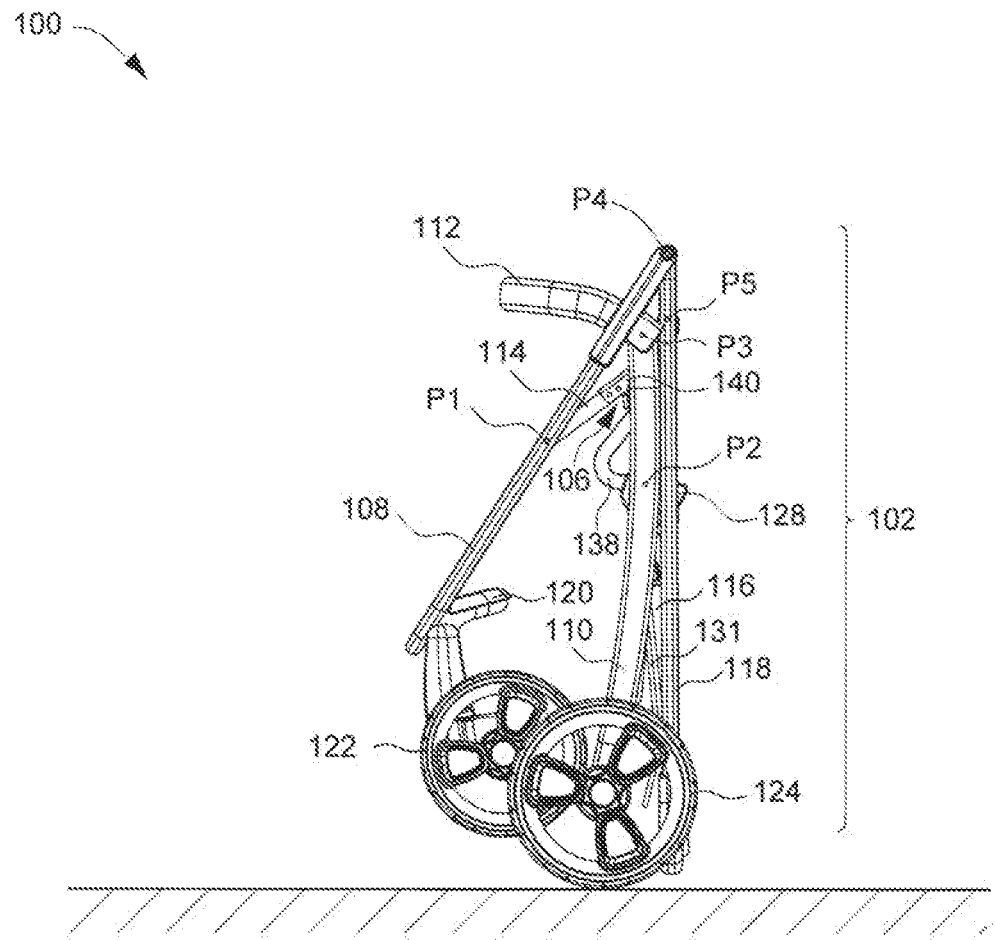

Reference is made to FIGS. 5-7 to describe a folding operation of the stroller apparatus 100. As shown in FIG. 5, when the stroller apparatus 100 is to be collapsed, the release actuator 144 can be pulled upward in a direction D1. As a result, each impeding part 142 is concurrently driven in rotation around the corresponding side segment 116B against the biasing action of the torsion spring 141, until the extension 146 disengages from the upper side of the transversal wall 140B to clear the way for rotational displacement of the first tube portion 114 and the joint housing 140 relative to the second tube portion 116. In one embodiment, the impeding part 142 may be rotated until the extension 146 adjacently faces the sidewall 140A of the joint housing 140 at an outer side of the second tube portion 116 (i.e., a side facing the outside of the stroller apparatus 100).

Referring to FIG. 6, while the release actuator 144 is pulled upward, the entire stroller apparatus 100 can also be raised above the ground. Once the impeding part 142 has reached the unlocking state, gravity action can cause the first tube portions 114 and the first leg frame 108 to rotate in a direction R1, and the second tube portion 116 and the second leg frame 110 to rotate in an opposite direction R2. As a result, the first and second leg frames 108 and 110, and the first and second tube portions 114 and 116 can self fold onto each other. During folding, each first rod segment 134 can also rotate about the connection shaft P5 relative to the handle 118, and the handle 118 can rotate in a direction R3 to collapse rearward of the support frame 102.

Owing to the engagement between the latch 130 and the holding bracket 128, the backrest frame 126, the second rod segment 136 and the L-shaped linkage 138 can concurrently rotate along with the first rod segment 134.

As shown in FIG. 7, once the stroller apparatus 100 is fully collapsed, the second leg frame 110, the handle 118 and the backrest frame 126 can lie substantially parallel and adjacent to one another, and the collapsed stroller apparatus 100 can stand on the ground.

Figure 8:
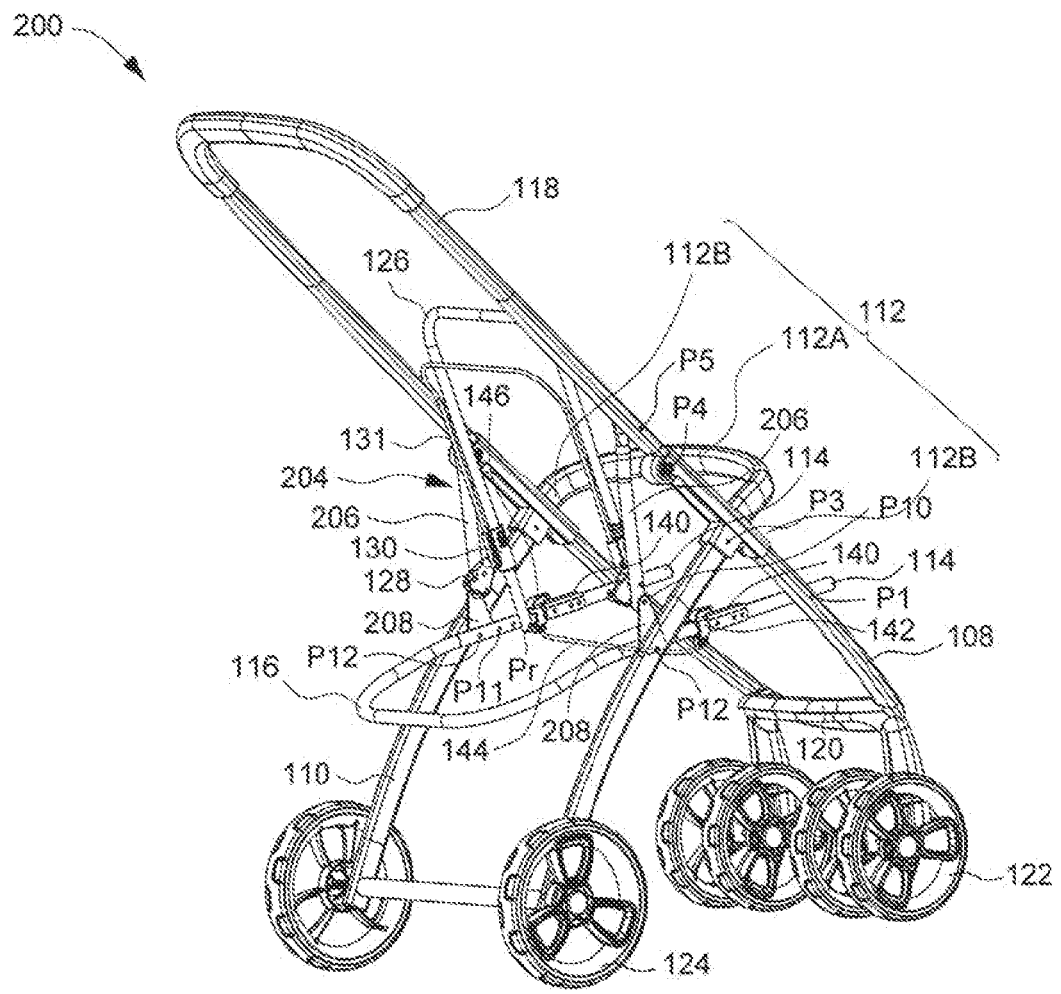
FIG. 8 is a perspective view illustrating a second embodiment of a collapsible stroller apparatus.
Figure 9:
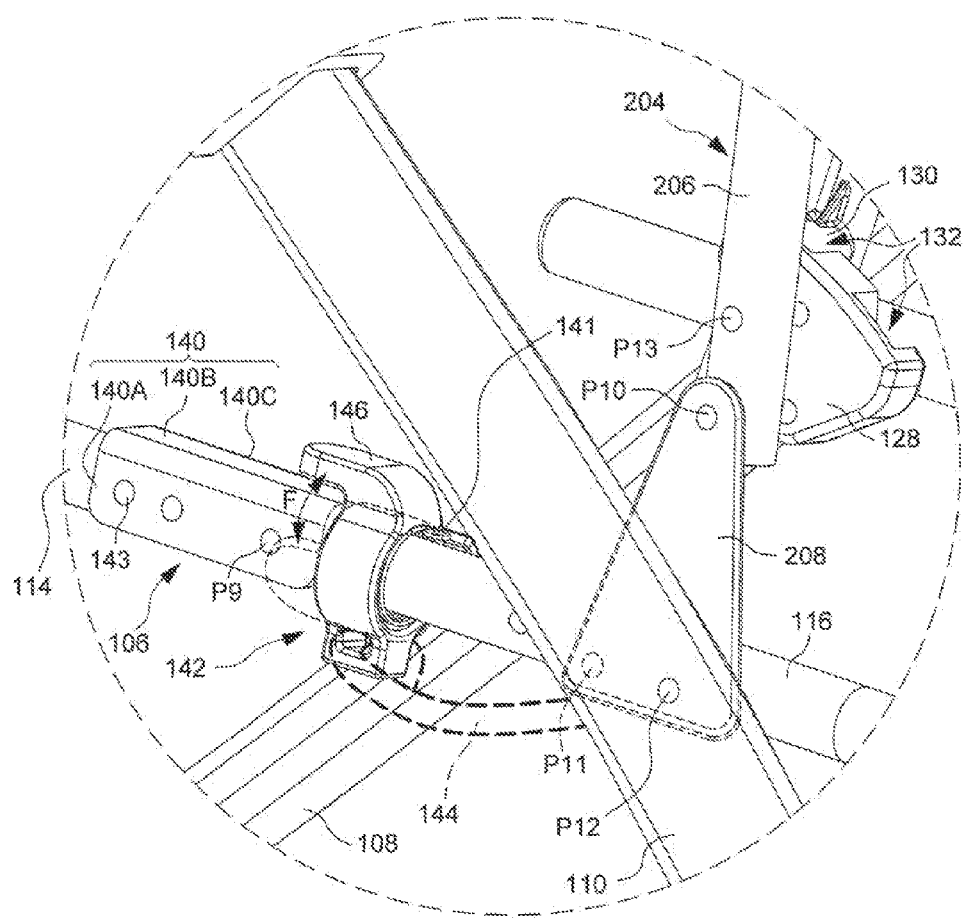
FIG. 9 is an enlarged view illustrating a frame locking structure implemented in the stroller apparatus shown in FIG. 8.

FIG. 8 is a perspective view illustrating a second embodiment of a collapsible stroller apparatus 200, and FIG. 9 is an enlarged view illustrating a frame locking structure 106 implemented in the stroller apparatus 200. The stroller apparatus 200 can be similar to the embodiment described previously, but can have a simplified linkage structure. The stroller apparatus 200 can include two linkage structures 204 disposed at the left and right sides of the support frame and connected with the handle 118 and the seat frame. Each linkage structure 204 can include a rod segment 206, and a linkage plate 208 having a triangular shape. The rod segment 206 can have an upper end portion pivotally connected with the handle 118 via a connection shaft P5, and a lower end portion pivotally connected with the linkage plate 208 via a connection shaft P10. The linkage plate 208 can be securely affixed with the second tube portion 116 via two connection shafts P11 and P12, the second leg frame 110 being also pivotally connected with the linkage plate 208 via the connection shaft P12.

The lower end portion of the rod segment 206 can be pivotally connected with the holding bracket 128 via a connection shaft P13 located above the connection shaft P10. Accordingly, the rod segment 206 can be pivotally connected with the linkage plate 208 and the holding bracket 128 via the connection shafts P10 and P13, respectively.

Like previously described, the backrest frame 126 can have left and right side segments assembled with two latches 130. Lower ends of the left and right side segments of the backrest frame 126 can be pivotally connected with the side segments 116B of the second tube portion 116 (as better shown in FIG. 8).

Each latch 130 can be connected with the release actuator 131, and can be operable to engage any of a plurality of locking grooves 132 formed in the holding socket 128 at different radial directions relative to the pivot axis of the backrest frame 126.

Figure 10:
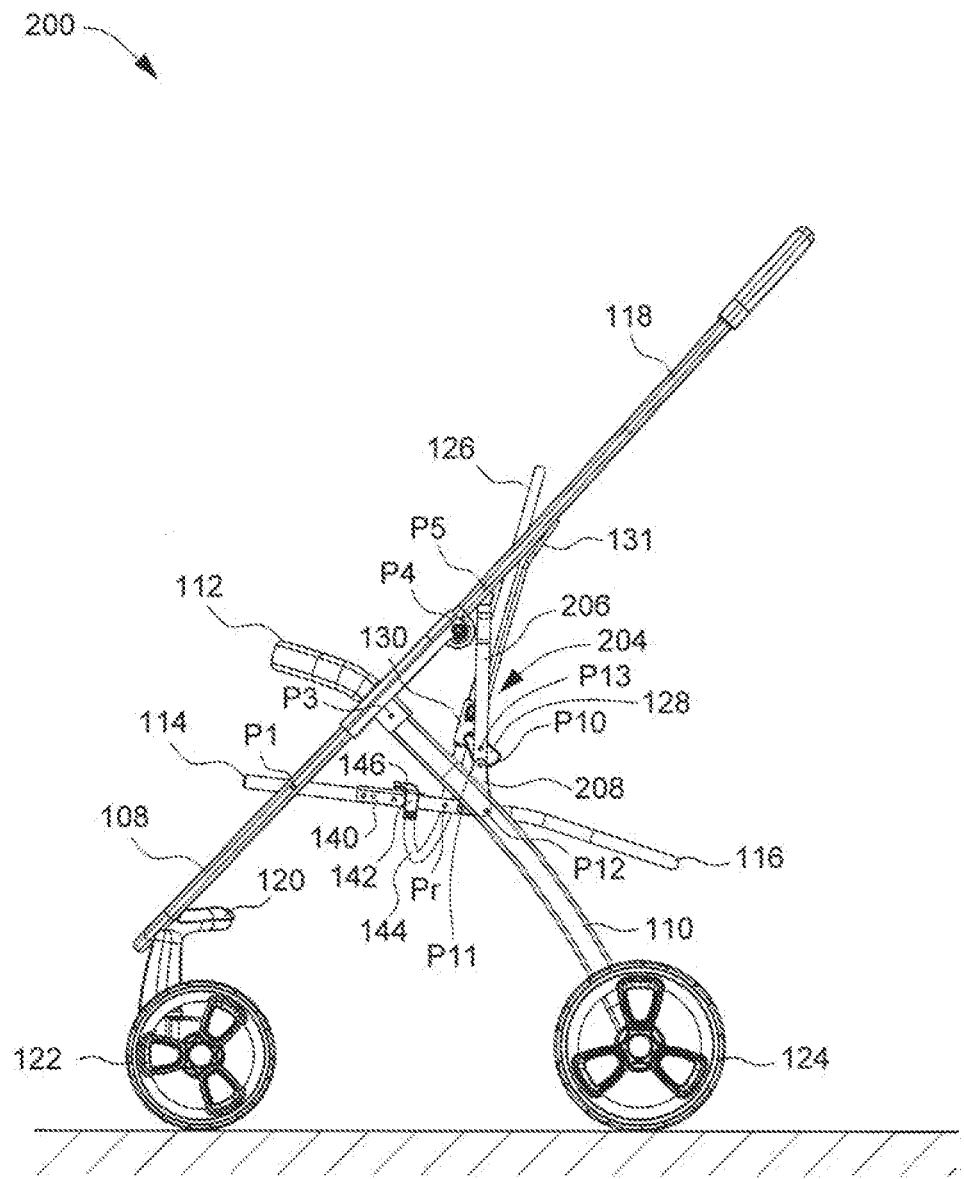
FIG. 10 is a side view of the stroller apparatus shown in FIG. 8.
Figure 11:
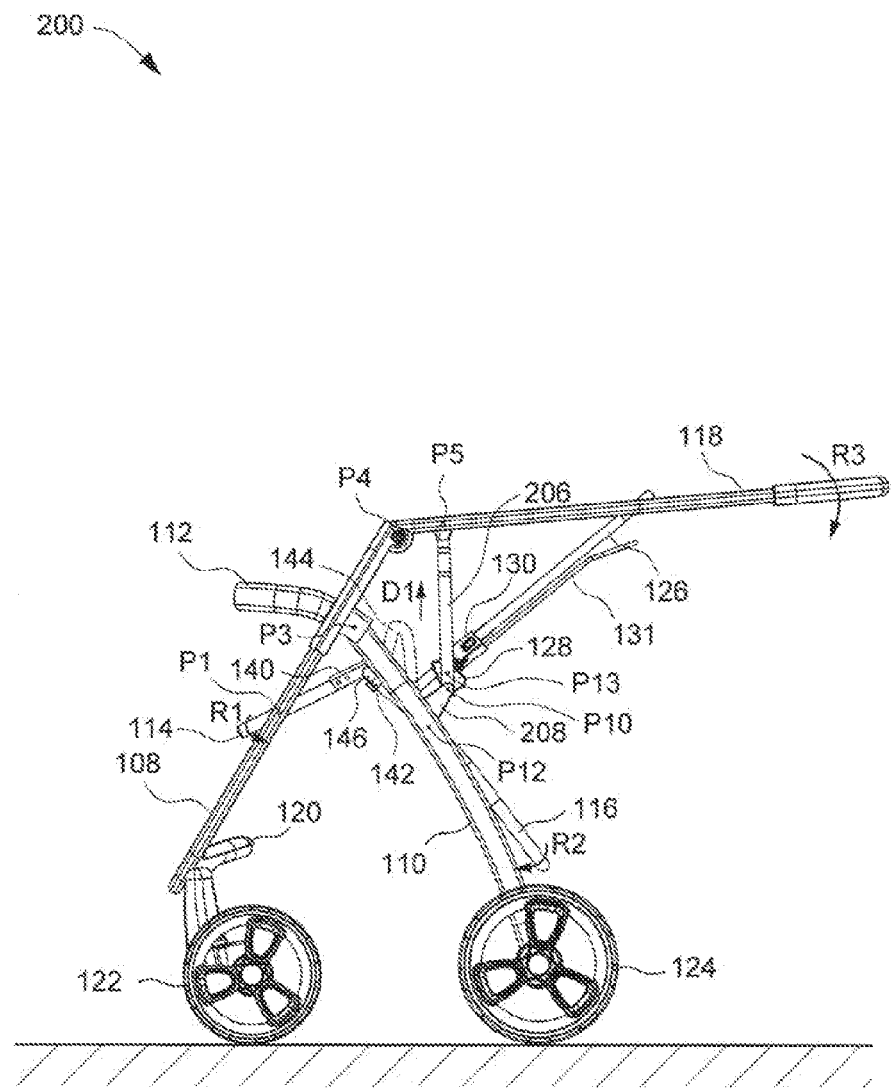
FIG. 11 is a schematic view illustrating a folding operation of the stroller apparatus shown in FIG. 8.

FIG. 10 is a side view of the stroller apparatus 200, and FIG. 11 is a schematic view illustrating a folding operation of the stroller apparatus 200. Like in the previous embodiment, the release actuator 144 can be pulled upward in the direction D1 to cause the impeding parts 142 to concurrently rotate around the side segments 116B, until the extensions 146 disengage from the upper side of the transversal walls 140B.

Referring to FIG. 11, while the release actuator 144 is pulled upward to displace the impeding parts 142 to the unlocking state, the entire stroller apparatus 100 can also be raised above the ground. Owing to gravity action, the first tube portions 114 and the first leg frame 108 can accordingly rotate in the direction R1, and the second tube portion 116 and the second leg frame 110 can rotate in the opposite direction R2. The first and second leg frames 108 and 110, and the first and second tube portions 114 and 116 can thereby fold onto each other. During folding, each rod segment 206 can also rotate about the connection shaft P5 relative to the handle 118, and the handle 118 can rotate in the direction R3 to collapse rearward. Owing to the engagement between the latch 130 and the holding bracket 128, the backrest frame 126 and the linkage plate 208 can concurrently rotate along with the rod segment 206.

Once the stroller apparatus 200 is fully collapsed, the second leg frame 110, the handle 118 and the backrest frame 126 can lie substantially parallel and adjacent to one another, and the collapsed stroller apparatus 200 can stand on the ground.

Figure 12:
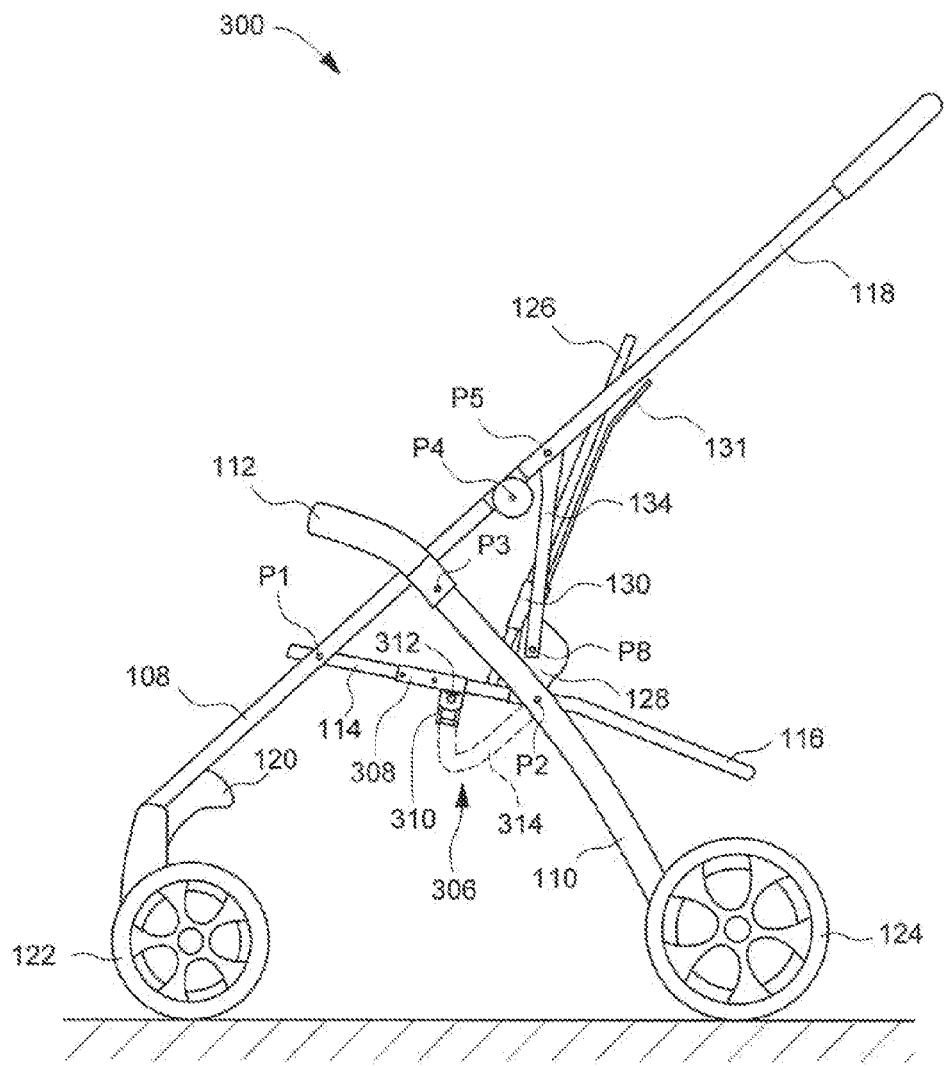
FIG. 12 is a schematic view illustrating a third embodiment of a collapsible stroller apparatus.
Figure 13:
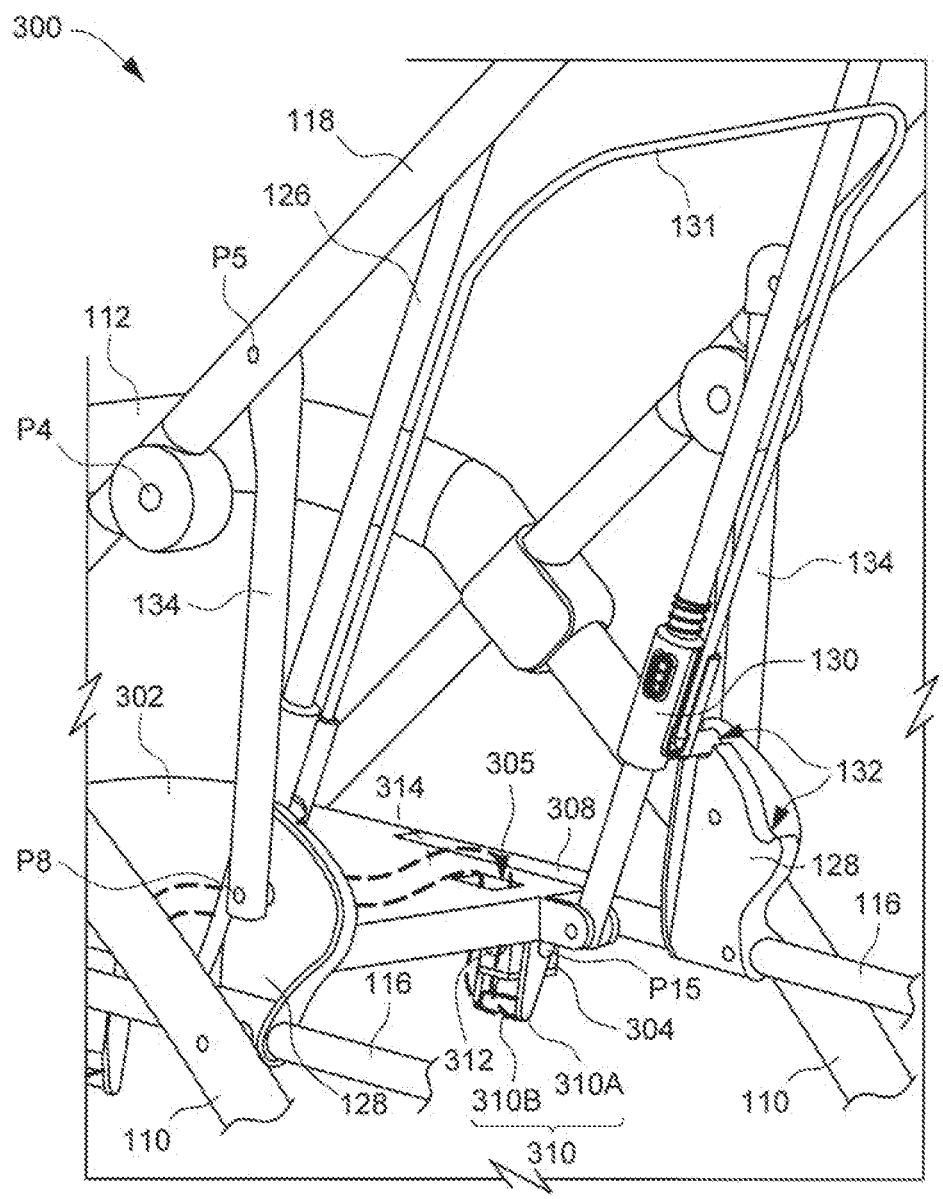
FIG. 13 is a partially enlarged view of a portion of the stroller apparatus shown in FIG. 12.

FIG. 12 is a schematic view illustrating a third embodiment of a collapsible stroller apparatus 300, and FIG. 13 is a partially enlarged view of a portion of the stroller apparatus 300. The stroller apparatus 300 can include a seat 302 having an underside provided with two brackets 304 that are respectively disposed near a left and a right side edge of the seat 302. The backrest frame 126 can have left and right side segments provided with two latches 130. Lower end portions of the backrest side segments can be pivotally connected with a rear edge of the seat 302. The two holding brackets 128 can be respectively affixed with the side segments 116B of the second tube portion 116. A surface of each holding bracket 128 can include a plurality of locking grooves 132 that are distributed on different radial directions relative to the pivot axis of the backrest frame 126. Each of the two latches 130 can movably engage with any of the locking grooves 132 of the associated holding bracket 128 to lock the backrest frame 126 at a desired inclination, and disengage from the locking grooves 132 for adjustment when the release actuator 131 is pulled upward. A release actuator 131 connected with each of the latches 130 can be operable to switch the latches 130 from the locking state to the unlocking state.

In addition, two linkage structures can be assembled at the left and right sides between side segments of the handle 118 and the seat frame. Each linkage structure can include a rod segment 134 that has a first end pivotally connected with a side segment of the handle 118 via a connection shaft P5, and a second end pivotally connected with the holding bracket 128 via a connection shaft P8. In this embodiment, the rod segment 136 and the L-shaped linkage 138 can be omitted from the linkage structure.

Two frame locking structures 306 similar in construction can be respectively assembled with the two first tube portions 114 and the second tube portion 116. Each frame locking structure 306 can be disposed between the connection shafts P1 and P2, and below the connection shaft P3. Each frame locking structure 306 can include a joint housing 308, a rotary arm 310 and an impeding part 312. The joint housing 308 can be affixed with one first tube portion 114, and pivotally connected with one side segment 116B of the second tube portion 116.

The rotary arm 310 can be pivotally connected with one bracket 304. The impeding part 312 can be assembled so as to pass through the bracket 304 and the joint housing 308.

The stroller apparatus 300 can also include a release actuator 314 that can extend transversally above an upper surface of the seat 302. The release actuator 314 can be formed as a strap. The seat 302 can include two holes 305 transversally spaced apart from each other through which the release actuator 314 can be routed toward the underside of the seat 302 for connecting with the two rotary arms 310.

Figure 14:
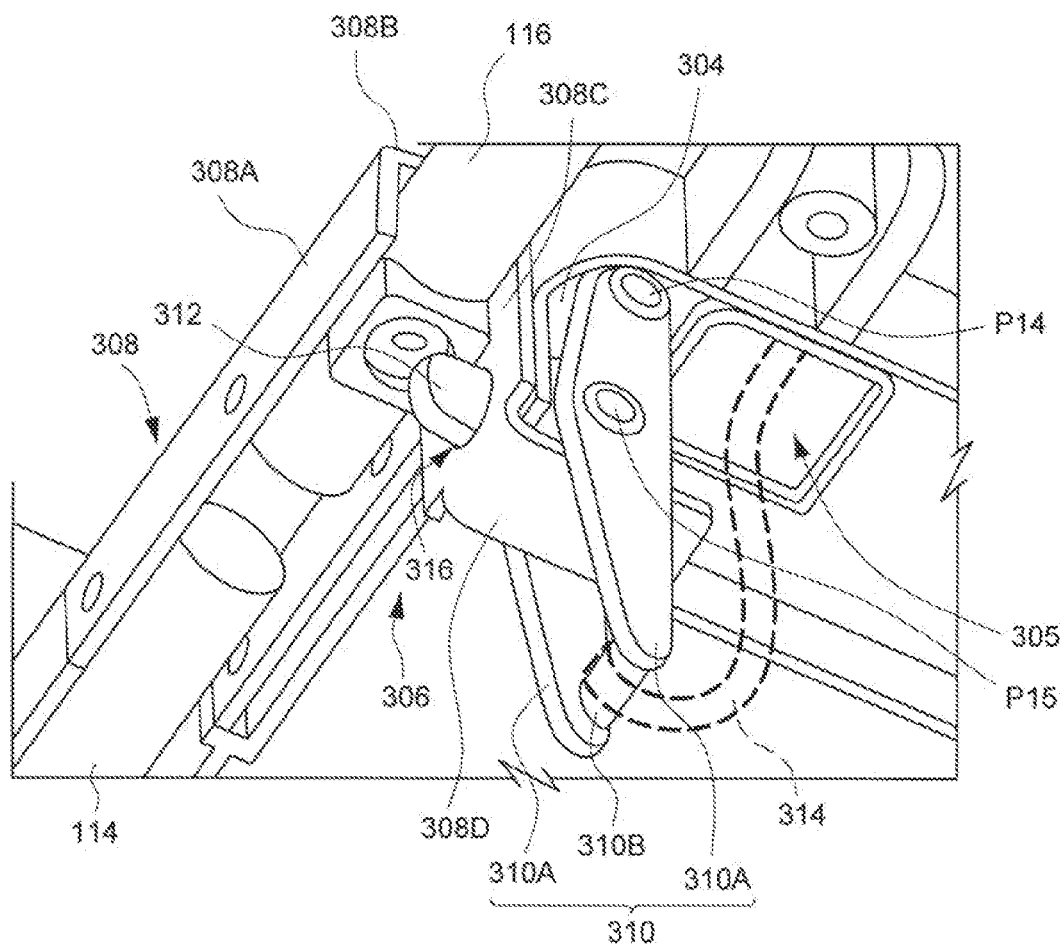
FIG. 14 is a perspective view illustrating a frame locking structure of the stroller apparatus shown in FIG. 12 in a locking state.
Figure 15:
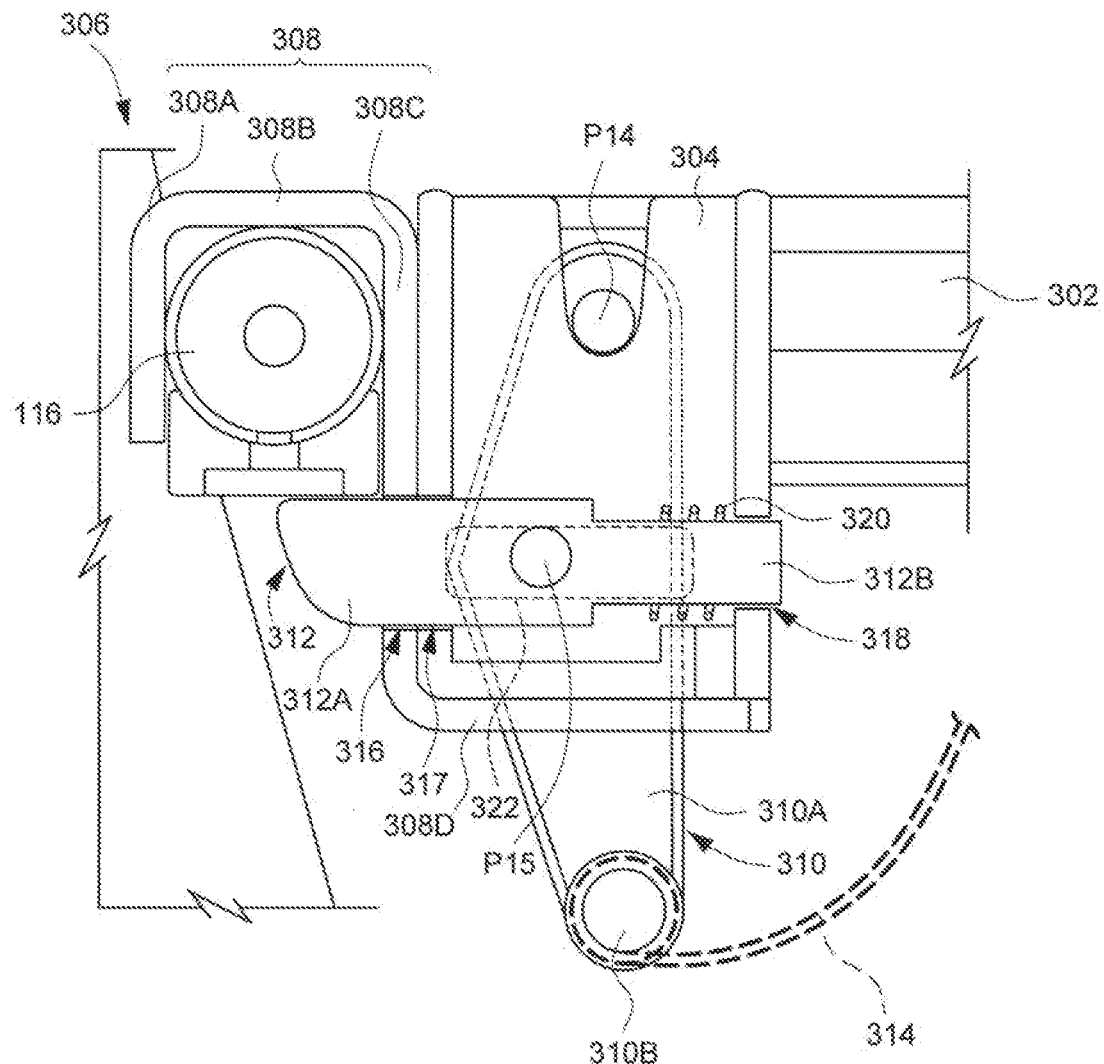
FIG. 15 is a side planar view of the frame locking structure represented in FIG. 14 in the same locking state.

FIG. 14 is a perspective view illustrating the frame locking structure 306 in a locking state, and FIG. 15 is a side planar view representing the frame locking structure 306 in the same locking state shown in FIG. 14. The joint housing 308 can include two parallel sidewalls 308A and 308C facing each other, a transversal wall 308B connected with upper ends of the sidewalls 308A and 308C, and a tongue 308D extending parallel to the transversal wall 308B to the outside of the gap between the sidewalls 308A and 308C. The joint housing 308 may be affixed with the bracket 304 at the tongue 308D.

One first tube portion 114 can be affixed with the joint housing 308 between the sidewalls 308A and 308C, and one side segment 116B of the second tube portion 116 can be pivotally connected with the joint housing 308 between the sidewalls 308A and 308C.

The rotary arm 310 can include two spaced-apart sidewalls 310A, and a bar 310B connected between the sidewalls 310A. The sidewalls 310A can be pivotally connected with the bracket 304 via a connection shaft P14 that defines a pivot axis of the rotary arm 310. For mounting the impeding part 312, the sidewall 308C of the joint housing 308 can have a hole 316, and two opposite sidewalls of the bracket 304 can respectively have holes 317 and 318. The impeding part 312 can be arranged in the gap between the sidewalls 310A of the rotary arm 310, and can have opposite ends 312A and 312B respectively extending through the holes 316, 317 and 318. A connection shaft P15 can be connected with the sidewalls 310A of the rotary arm 310, and respectively pass through the impeding part 312 and elongated slots 322 (better shown in FIG. 16) formed through two opposite sidewalls of the bracket 304. With this construction, the impeding part 312 and the connection shaft P15 can be operable to move on a plane perpendicular to the pivot axis of the rotary arm 310 (i.e., connection shaft P14), and along a transversal direction that is substantially perpendicular to a direction of extension of the first tube portion 114 and the side segment 116B of the second tube portion 116. Displacement of the impeding part 312 can cause the end 312A to either extend through the hole 316 into the gap region between the sidewalls 308A and 308C of the joint housing 308, or to retract toward the interior of the bracket 304 so as to lie outside the gap region between the sidewalls 308A and 308C.

A spring 320 can be assembled around the end 312B of the impeding part 312 and have an end connected with a sidewall of the bracket 304 adjacent to the hole 318. The spring 320 can bias the impeding part 312 toward a locking position where the end 312A of the impeding part 312 can extend through the joint housing 308 into the gap region between the sidewalls 308A and 308C.

The release actuator 314 can have two opposite ends respectively secured with the bars 310B of the two rotary arms 310. The release actuator 314 can be operable to drive rotation of the two rotary arms 310 in opposite directions, which in turn drive displacement of the impeding parts 312 in opposite directions toward a center of the stroller apparatus 300.

When the frame locking structure 306 is in the locking state as shown in FIG. 15, the spring 320 can bias the impeding part 312 to a position where the end 312A of the impeding part 312 extends through the joint housing 308 into the gap region between the sidewalls 308A and 308C. As a result, the side segment 116B of the second tube portion 116 can be downwardly abutted by the impeding part 312 and upwardly abutted by the transversal wall 308B of the joint housing 308, which can effectively block folding rotation of the second tube portion 116 relative to the joint housing 308 and the first tube portion 114. Accordingly, the first and second tube portions 114 and 116 can be locked in the unfolded state.

Figure 16:
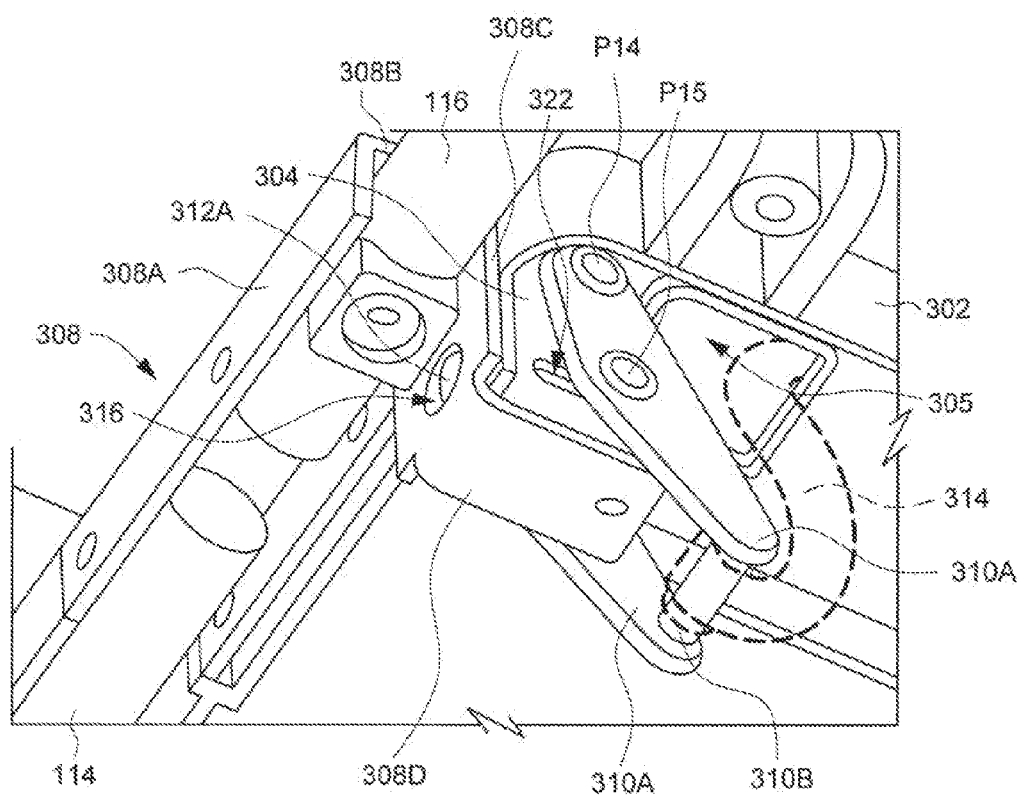
FIG. 16 is a schematic view illustrating the frame locking structure shown in FIG. 14 in an unlocking state.
Figure 17:
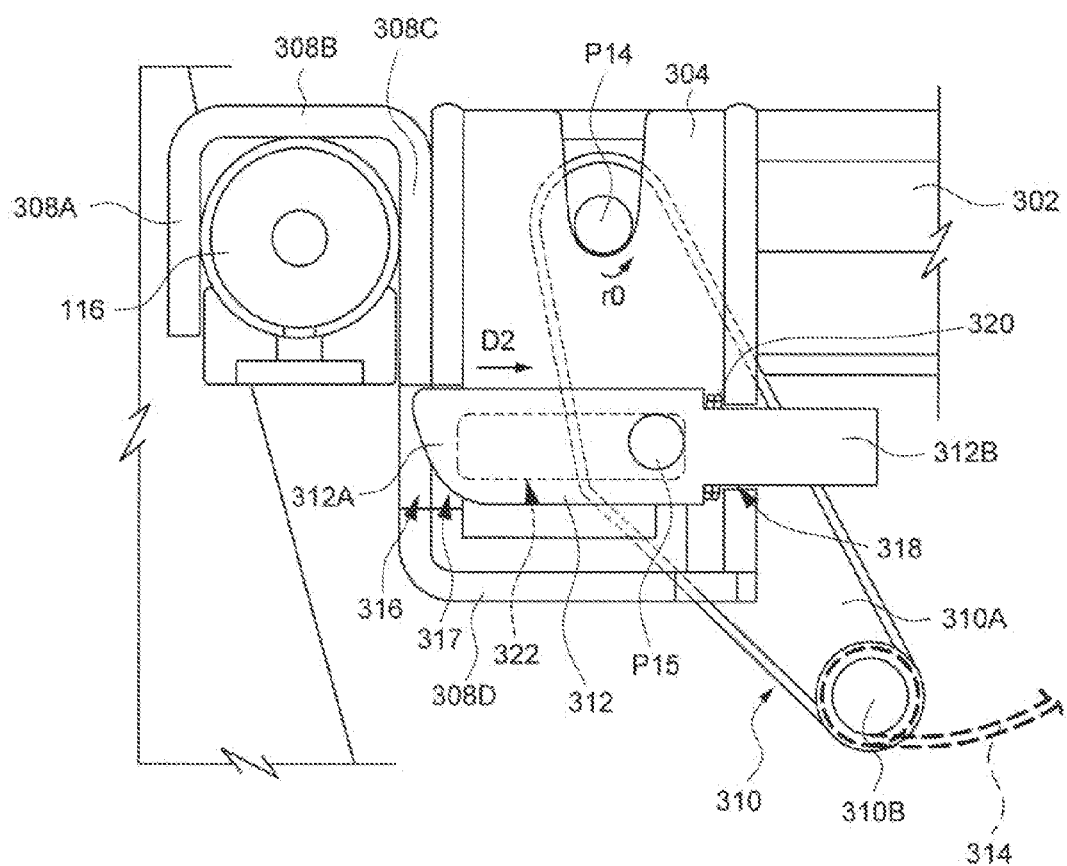
FIG. 17 is a side view of the frame locking structure represented in FIG. 16.

FIG. 16 is a schematic view illustrating the frame locking structure 306 in the unlocking state, and FIG. 17 is a side view of the frame locking structure 306 shown in FIG. 16. When the release actuator 314 is pulled upward in the direction D1, the rotary arm 310 can rotate about the axis of the connection shaft P14 relative to the bracket 304 in a direction r0 toward an inner side of the support frame 102. While the rotary arm 310 is rotating, the connection shaft P15 can be driven to slide along the elongated slot 322, which can drive linear displacement of the impeding part 312 in the direction D2 toward the interior of the bracket 304. This displacement of the impeding part 312 can compress the spring 320, and disengage the end 312A of the impeding part 312 from the underside of the side segment 116B of the second tube portion 116. The impeding part 312 can thereby clear away from a path of rotation of the second tube portion 116 relative to the joint housing 308 and the first tube portion 114. Accordingly, the second tube portion 116 can rotate relative to the first tube portion 114 and the joint housing 308 to collapse the stroller apparatus 300.

It is worth noting that the width of the elongated slot 322 can be larger than the section of the connection shaft P15, such that upward and downward displacements of the connection shaft P15 are also permitted when the connection shaft P15 slides along the slot 322. This construction can facilitate driving of the impeding part 312 by the rotary arm 310.

Figure 18:
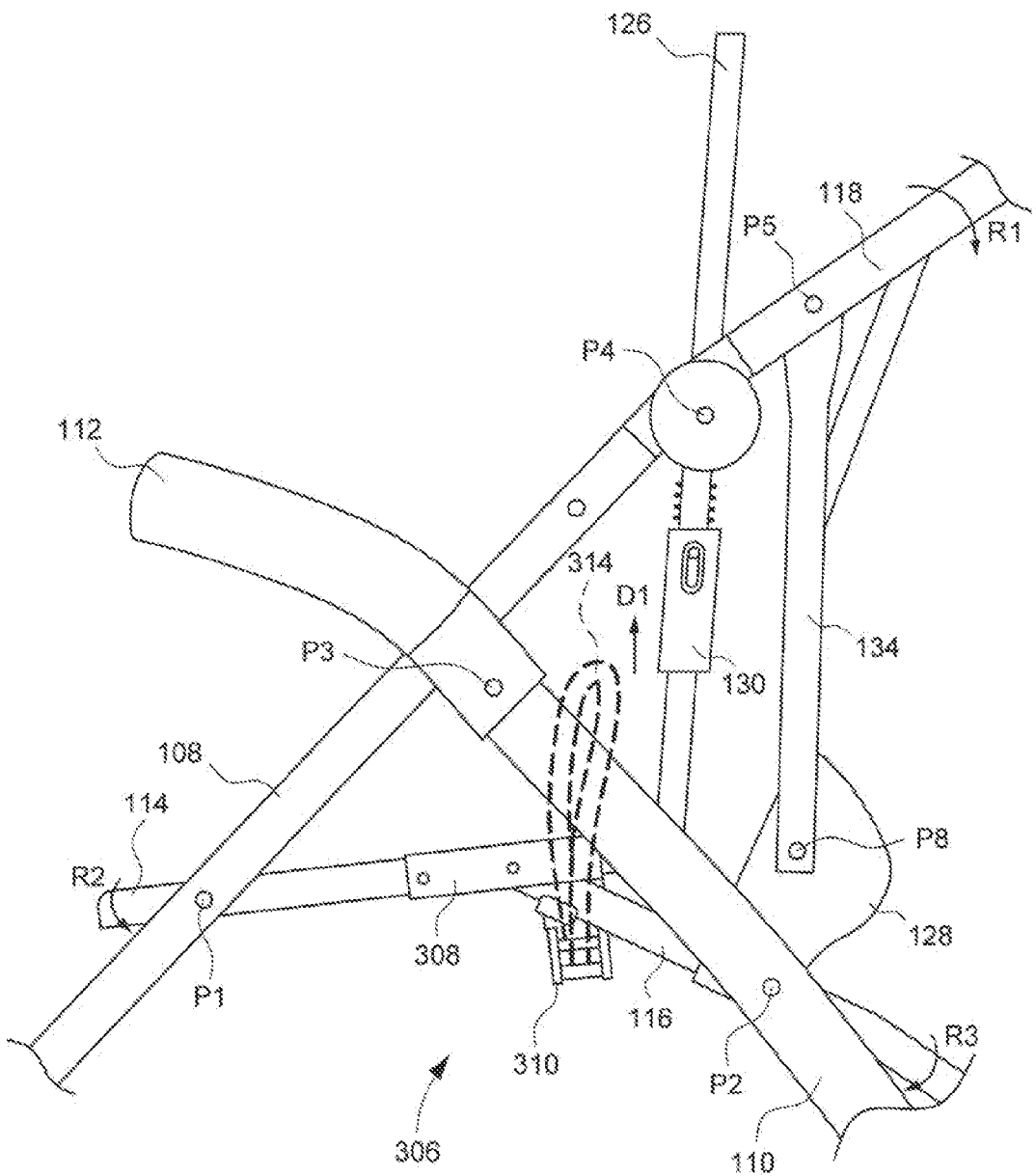
FIGS. 18 and 19 are schematic views illustrating a folding operation of the stroller apparatus shown in FIG. 12.
Figure 19:
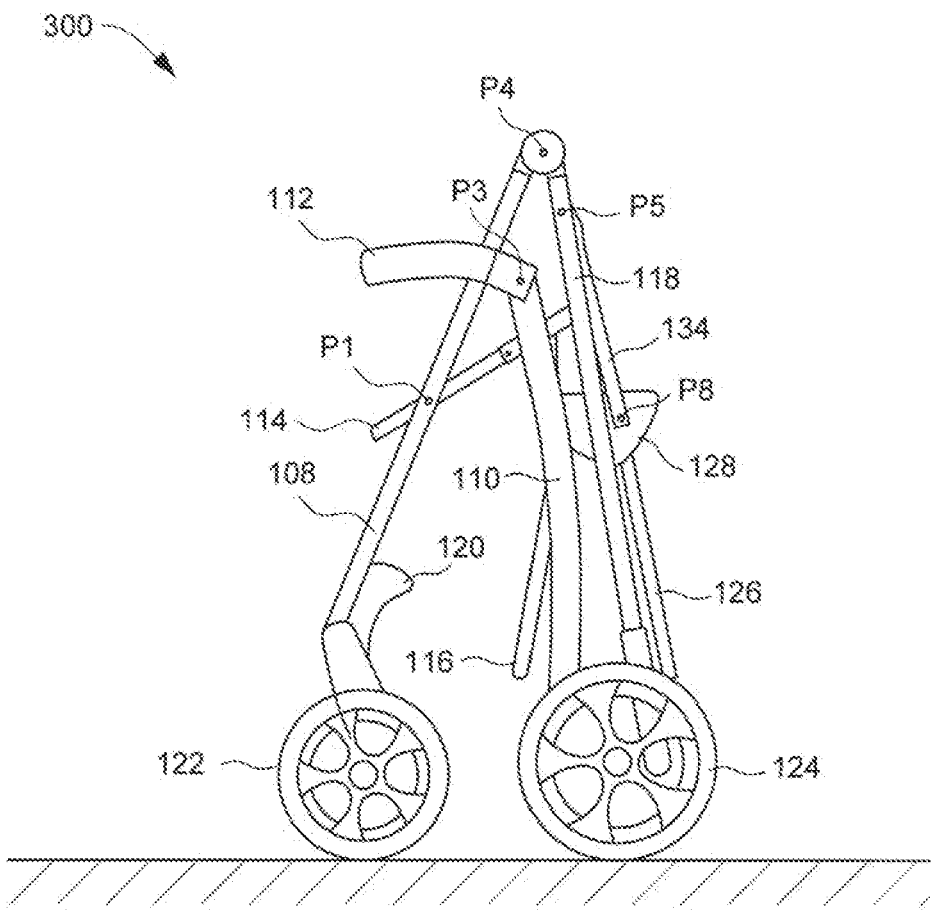

FIGS. 18 and 19 are schematic views illustrating a folding operation of the stroller apparatus 300. Referring to FIG. 18, the release actuator 314 can be pulled upward in the direction D1 to switch the frame locking structures 306 to the unlocking state. The handle 118 then can be pushed to rotate about the connection shaft P4 in the direction R1 toward the rear of the stroller apparatus 300. While the handle 118 is rotating, the rod segment 134 can rotate about the connection shaft P5 relative to the handle 118 (e.g., anti-clockwise direction in FIGS. 18 and 19). The displacement of the rod segment 134 can drive the backrest frame 126 and the second tube portion 116 to respectively rotate rearward in the same direction D1, whereas the first tube portion 114 and the second tube portion 116 can respectively fold toward each other in the directions R2 and R3. The concurrent movements of the first and second tube portions 114 and 116 can also drive the first and second leg frames 114 and 116 to fold toward each other. As shown in FIG. 19, once the stroller apparatus 300 is fully collapsed, the second leg frame 110, the handle 118 and the backrest frame 126 can be folded substantially parallel and adjacent to one another, and the collapsed stroller apparatus 300 can be disposed in a standing position on the ground.

Figure 20:
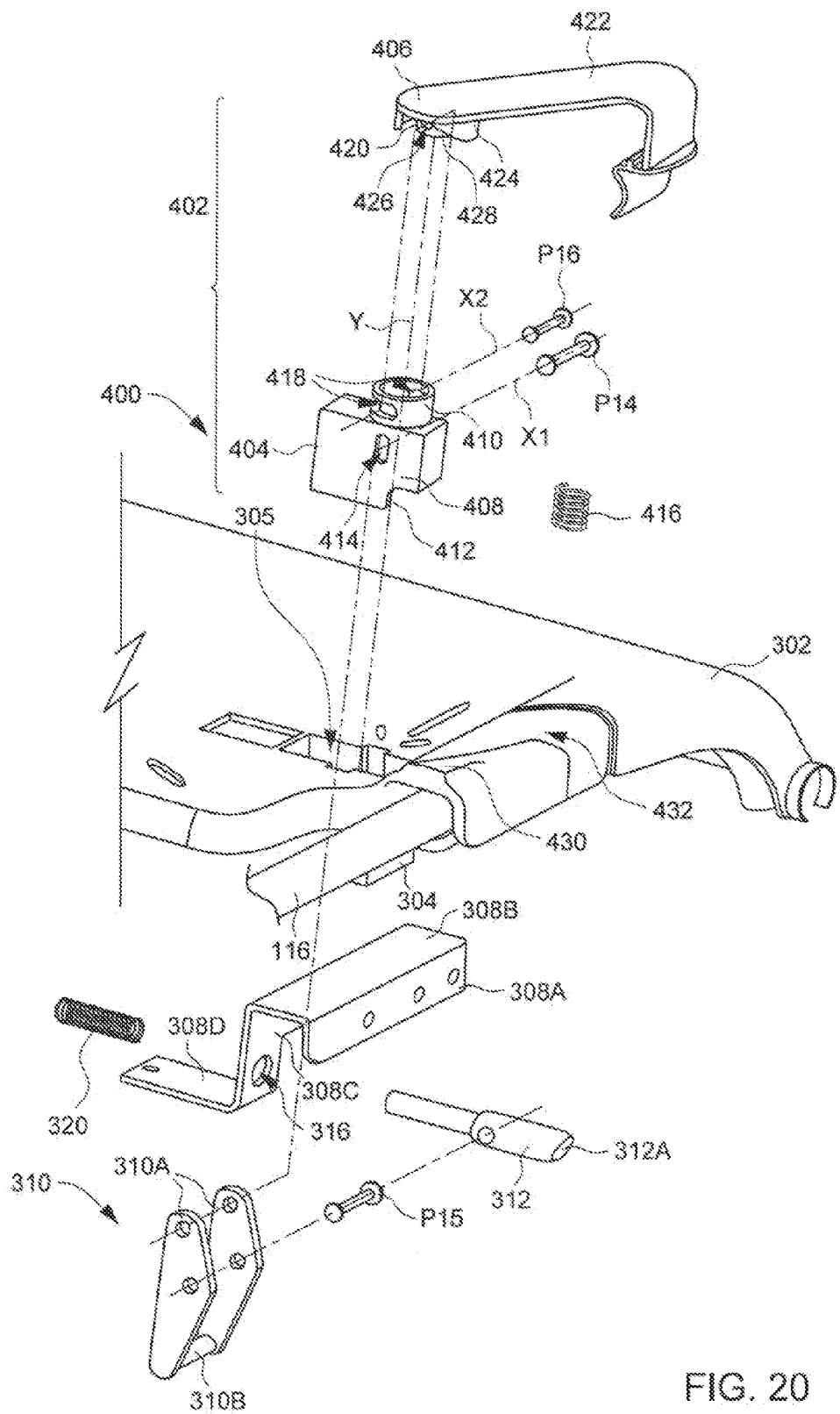
FIG. 20 is an exploded view illustrating another embodiment of a stroller apparatus provided with a safety lock device.

FIG. 20 is an exploded view illustrating another embodiment of a stroller apparatus 400 provided with an additional safety lock device 402. Aside the safety lock device 402, the stroller apparatus 400 can be substantially similar to the embodiment described in FIGS. 12-19. One or two safety lock devices 402 can be respectively associated with one or both of the frame locking structures 306. The safety lock device 402 has a locking or disable state in which unlocking of the frame locking structure 306 is blocked, and an unlocking or enabling state in which unlocking of the frame locking structure 306 is enabled.

The safety lock device 402 can include an arresting part 404 and a release actuator 406. The arresting part 404 can have a hollow body 408 provided with a sleeve portion 410. A lower portion of the body 408 can form a narrower portion that defines two stop flanges 412 spaced-apart from each other and delimiting a central cavity in which the impeding part 312 can be installed. The body 408 can also include elongated slots 414 that extend vertically above the stop flanges 412. The connection shaft P14 defining the rotation axis of the rotary arm 310 can be assembled along an axis X1 passing through the slots 414. A spring 416 can be assembled in the body 408 between the connection shaft P14 and an inner surface of the body 408 located below the connection shaft P14. The sleeve portion 410 can have a cylindrical shape that protrudes from an upper surface of the body 408 and has two slots 418 facing each other.

The release actuator 406 can include a coupling portion 420, a handle 422 and a ridge 424. The coupling portion 420, the handle 422 and the ridge 424 can be formed integral with the release actuator 406. The coupling portion 420 can have a cylindrical shape that protrudes downward from an end portion of the handle 422 and has two holes 426 at two opposite locations. The coupling portion 420 can have an outer diameter that is smaller than an inner diameter of the sleeve portion 410 of the arresting part 404, so that the coupling portion 420 can be inserted into the sleeve portion 410. The ridge 424 can protrude downward from the handle 422, and can extend around the coupling portion 420. The ridge 424 can define a cam surface 428 that can be in sliding contact with the seat 302 to convert rotation of the release actuator 406 into a vertical displacement thereof.

Figure 21:
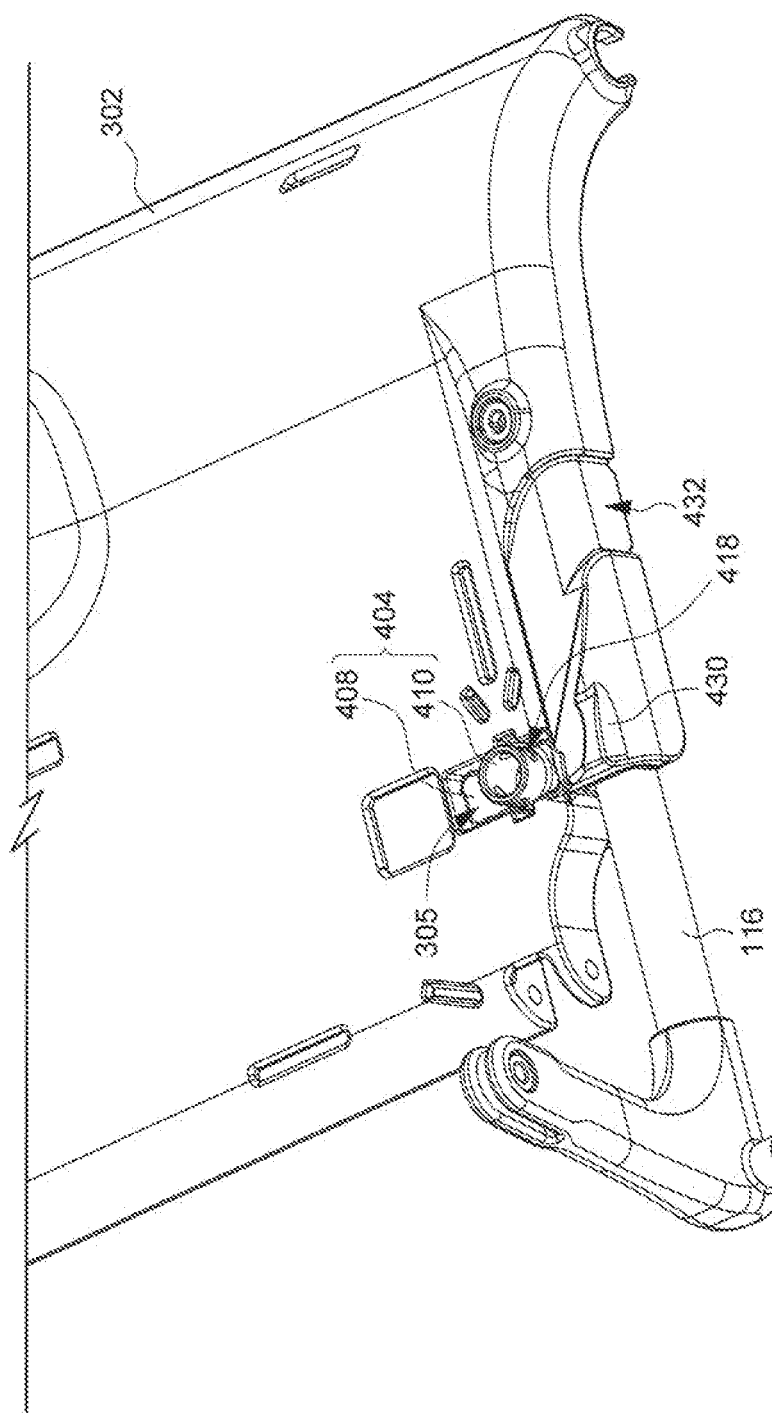
FIG. 21 is a perspective view illustrating the assembly of an arresting part in the safety lock device.

FIG. 21 is a perspective view illustrating the assembly of the arresting part 404. The arresting part 404 can be movably assembled with the bracket 304 at a position adjacent to the frame locking structure 306. Once the arresting part 404 is installed, the sleeve portion 410 can protrude outward from an opening 305 of the seat 302. The seat 302 can include a raised portion 430 spaced apart from the opening 305, and a recess 432 adjacent to the raised portion 430. The raised portion 430 can have a cam surface mating with the cam surface 428 of the release actuator 406.

Figure 22:
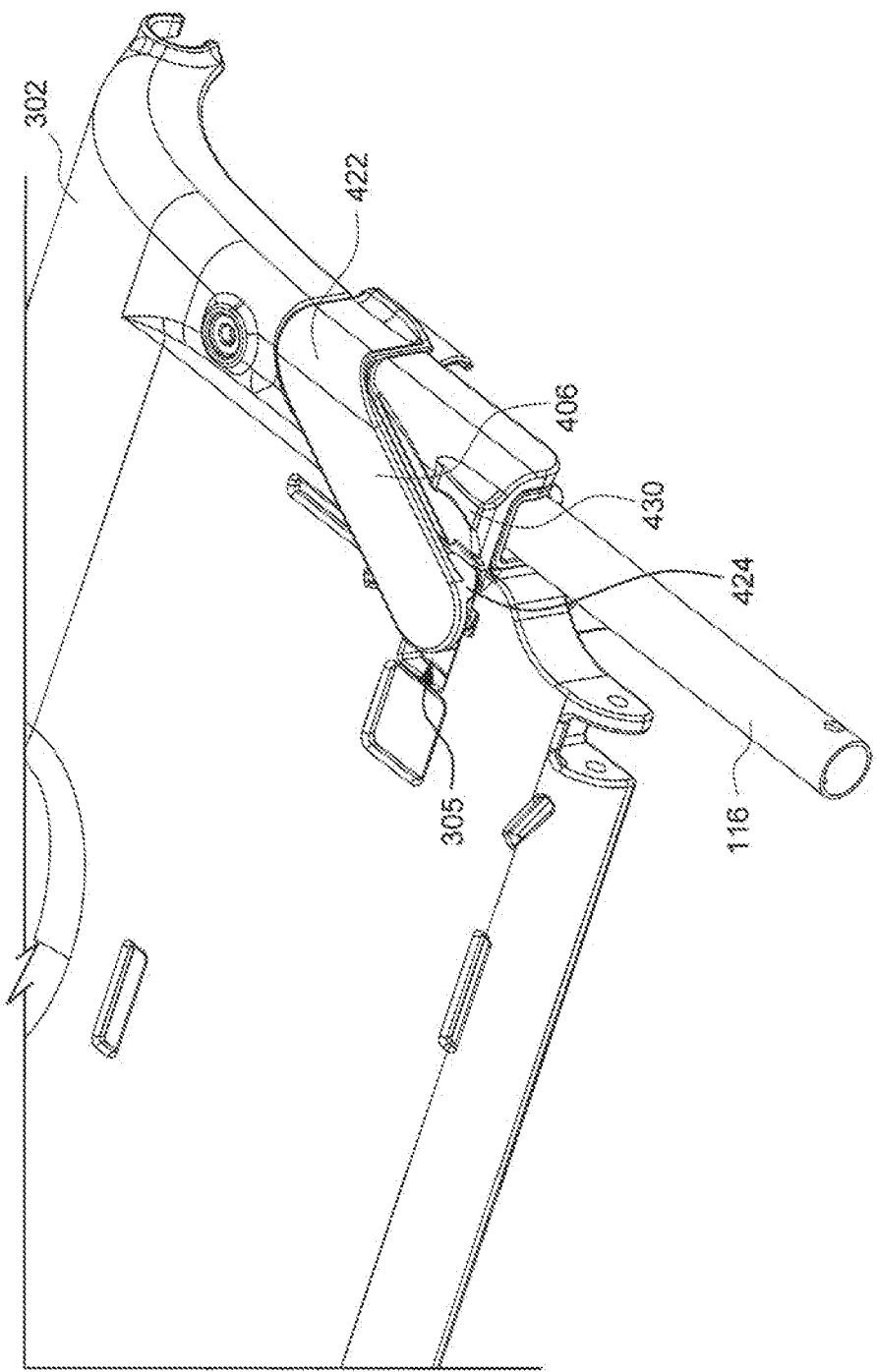
FIG. 22 is a perspective view illustrating the assembly of a release actuator in the safety lock device.

FIG. 22 is a perspective view illustrating the assembly of the release actuator 406. The release actuator 406 can be pivotally assembled with the arresting part 404 by inserting the coupling portion 420 into the sleeve portion 410. A connection shaft P16 can be mounted along an axis X2 through the slots 418 of the sleeve portion 410 and the holes 426 of the coupling portion 420. Accordingly, the release actuator 406 can be operable to rotate relative to the arresting part 404 about a pivot axis Y extending vertically, and owing to the interaction between the cam surface 428 with the seat 302, the rotation of the release actuator 406 can be converted into a displacement of the release actuator 406 along the axis Y which can concurrently drive movement of the arresting part 404 along the same axis Y.

Figure 23:
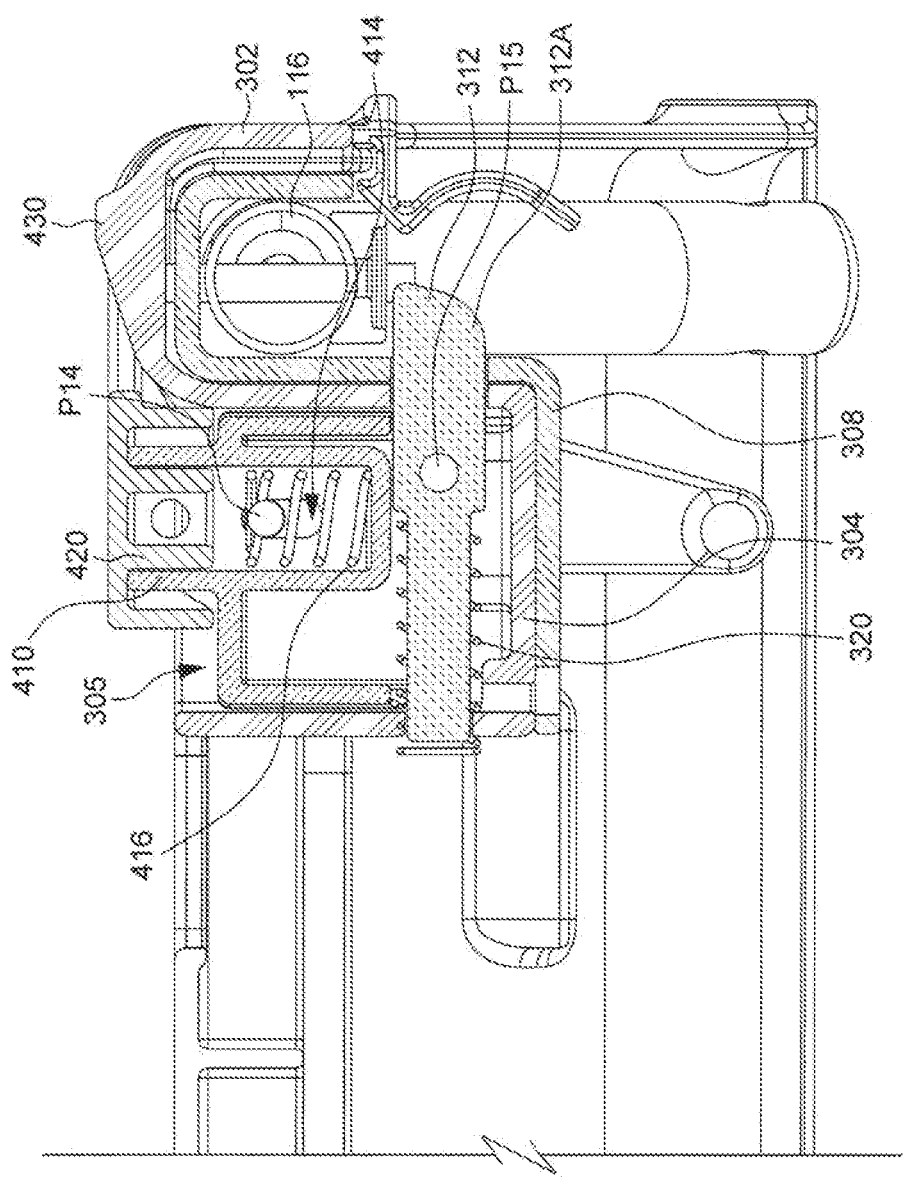
FIG. 23 is a cross-sectional view illustrating the safety lock device in a locking or disable state.

FIG. 23 is a cross-sectional view illustrating the safety lock device 402 in the locking or disable state. When the safety lock device 402 is in the locking or disable state, the release actuator 406 can be in a first position where the distal end of the handle 422 is located adjacent to a side edge of the seat 302. In this locking or disable state, the handle 422 can engage with the recess 432, the ridge 424 can extend into the opening 305, and the stop flanges 412 can abut against two opposite ends of the connection shaft P15 to block a displacement of the impeding part 312 in a direction that compresses the spring 320 and disengages the end 312A of the impeding part 312 from the underside of the second tube portion 116. Even if a caregiver attempts to operate the release actuator 314 of the frame locking structure 306, unlocking displacement of the impeding part 312 is still blocked by the arresting part 404. Accordingly, accidental collapse of the stroller apparatus 400 can be prevented.

Figure 24:
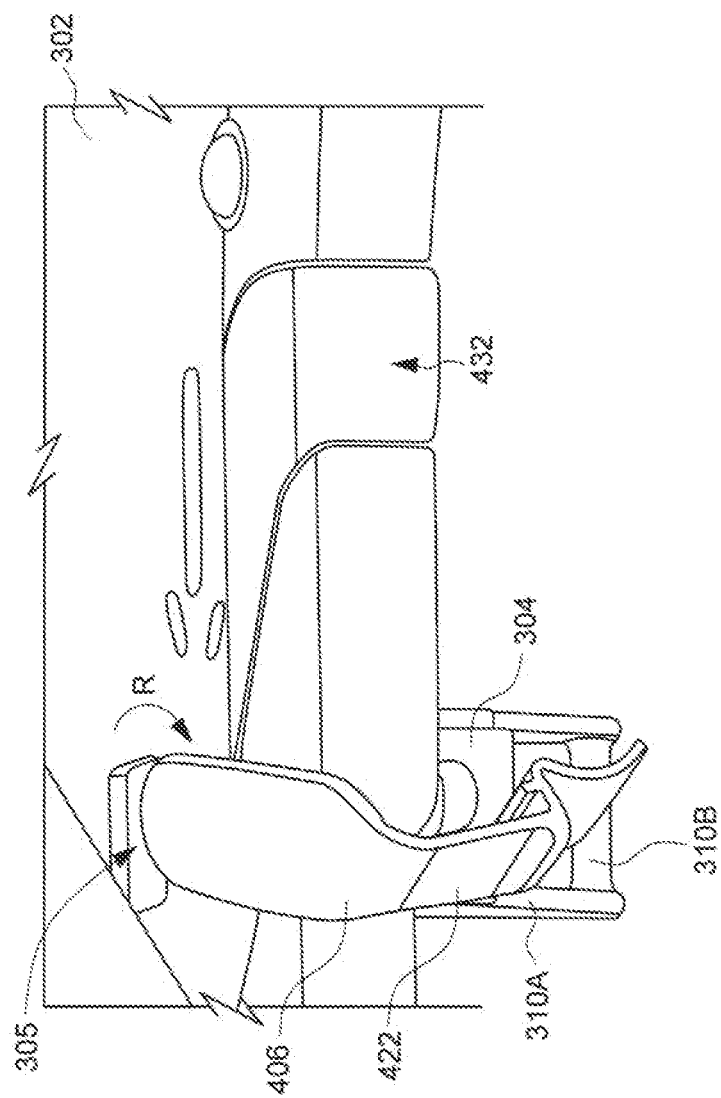
FIG. 24 is a schematic view illustrating an operation to switch the safety lock device from the locking or disable state to an unlocking or enabling state.
Figure 25:
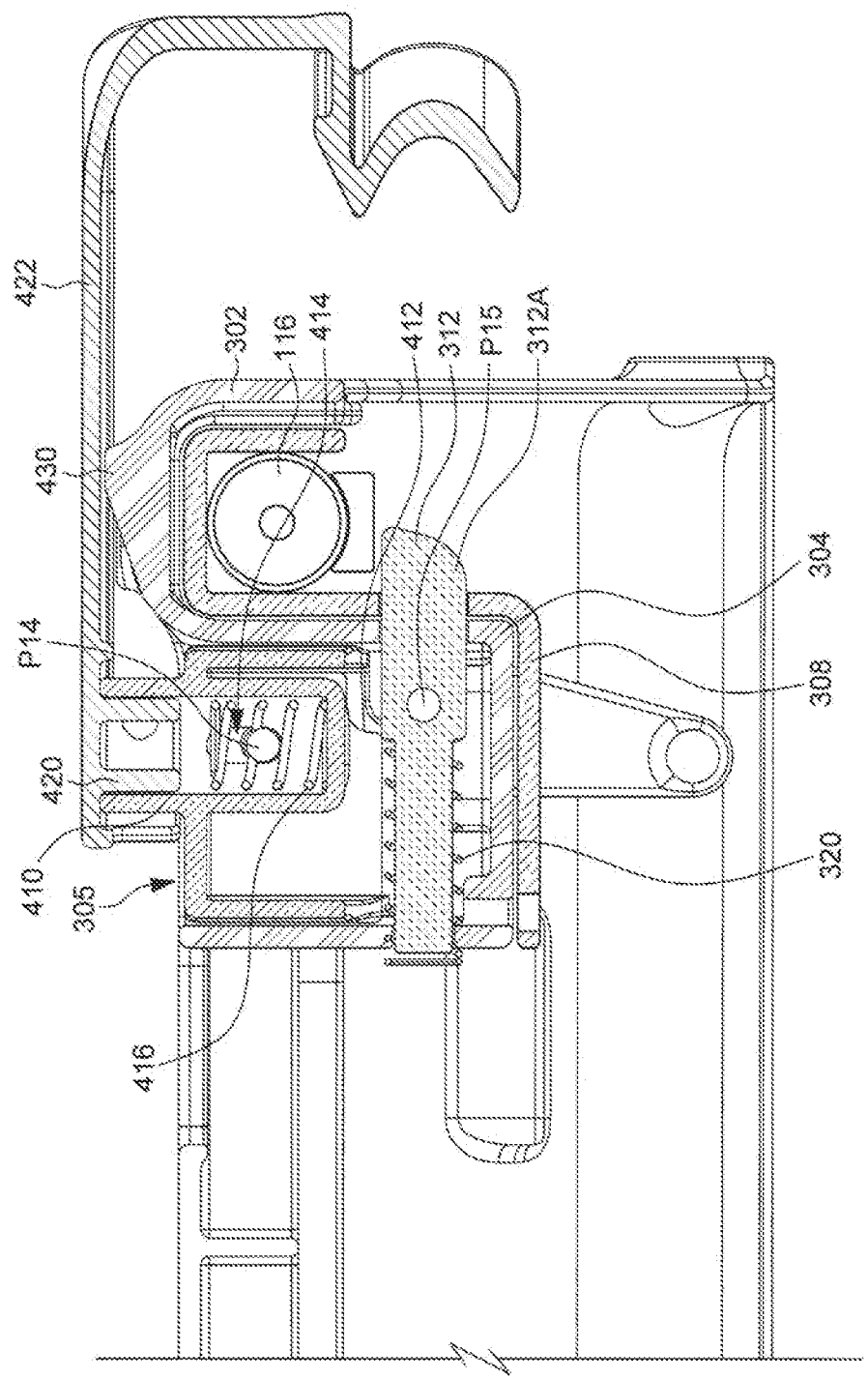
FIG. 25 is a cross-sectional view illustrating the safety lock device in the unlocking or enabling state.

FIG. 24 is a schematic view illustrating an operation to switch the safety lock device 402 from the locking or disable state to the unlocking or enabling state, and FIG. 25 is a cross-sectional view illustrating the safety lock device 402 in the unlocking or enabling state. For switching the safety lock device 402 from the locking or disable state to the unlocking or enabling state, the release actuator 406 can be turned in a direction R (e.g., clockwise direction in FIG. 24) to disengage the handle 422 from the recess 432 of the seat 302. While the release actuator 406 is rotating in the direction R, the cam surface 428 of the ridge 424 can move in contact with a rim of the opening 305 to push the ridge 424 upward toward the outside of the opening 305. This upward and rotating displacement of the release actuator 406 can pull the arresting part 404 upward along the interior of the bracket 304, which can compress the spring 416 and move the stop flanges 412 away from the connection shaft P15. The stop flanges 412 can be fully disengaged from the connection shaft P15 once the release actuator 406 reaches the unlocking or enabling position. In one embodiment, the handle 422 can engage and contact with the raised portion 430 to hold the arresting part 404 in the unlocking or enabling position. Once the obstruction created by the arresting part 404 has been removed from the path of displacement of the impeding part 312 in the unlocking direction, the release actuator 314 can be operated to disengage the impeding part 312 from the underside of the side segment 116B of the second tube portion 116. The stroller apparatus 400 then can be collapsed as described previously. While the second leg frame 110 is folding toward to the first leg frame 108, the second leg frame 110 can push and drive the release actuator 406 to disengage from the raised portion 430, and then to rotate reversely to drive the arresting part 404 to the locking or disable state.

Figure 26:
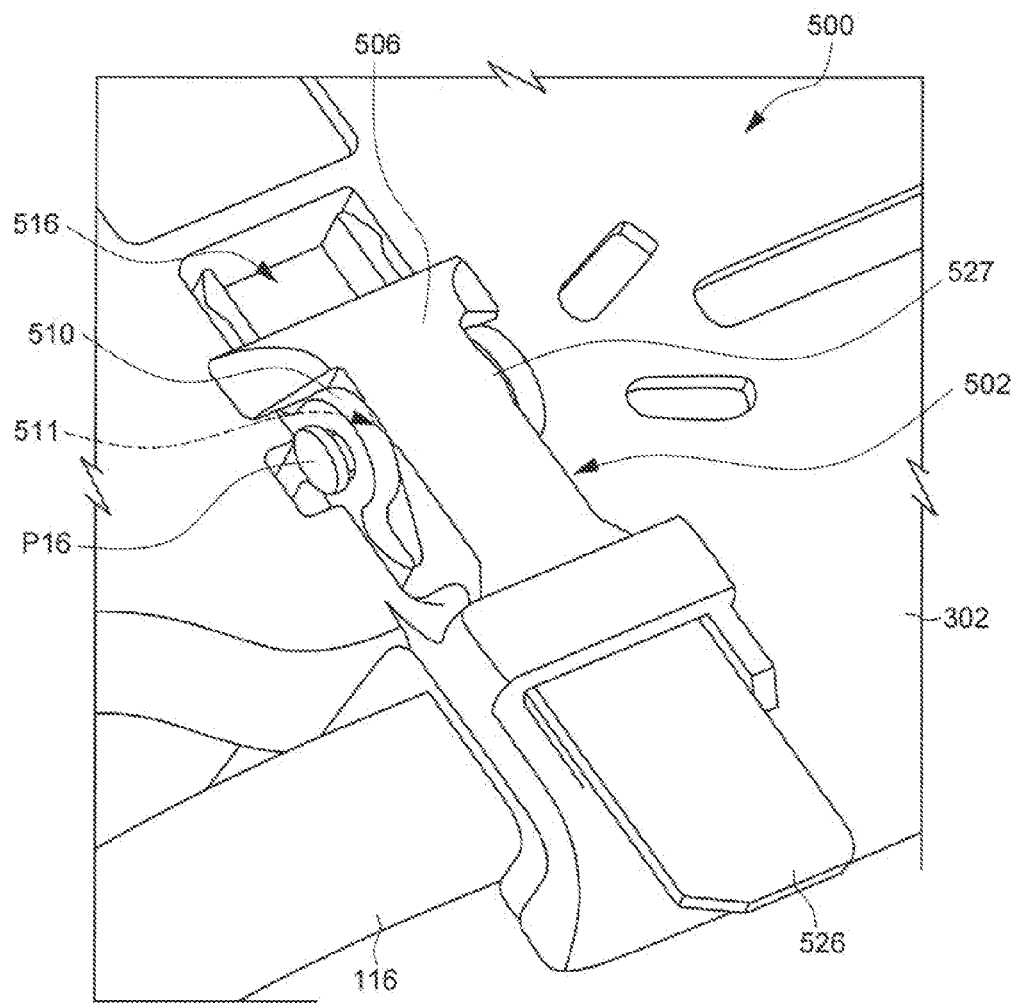
FIG. 26 is a schematic view illustrating another embodiment of a safety lock device provided in a stroller apparatus.

FIG. 26 is a schematic view illustrating another embodiment of a safety lock device 502 provided in a stroller apparatus 500. Aside the safety lock device 502, the stroller apparatus 500 can be substantially similar to the embodiment described in FIGS. 12-19. One or two safety lock devices 502 can be respectively associated with one or both of the frame locking structures 306. The safety lock device 502 has a locking or disable state in which unlocking of the frame locking structure 306 can be blocked, and an unlocking or enabling state in which unlocking of the frame locking structure 306 is enabled.

Figure 27:
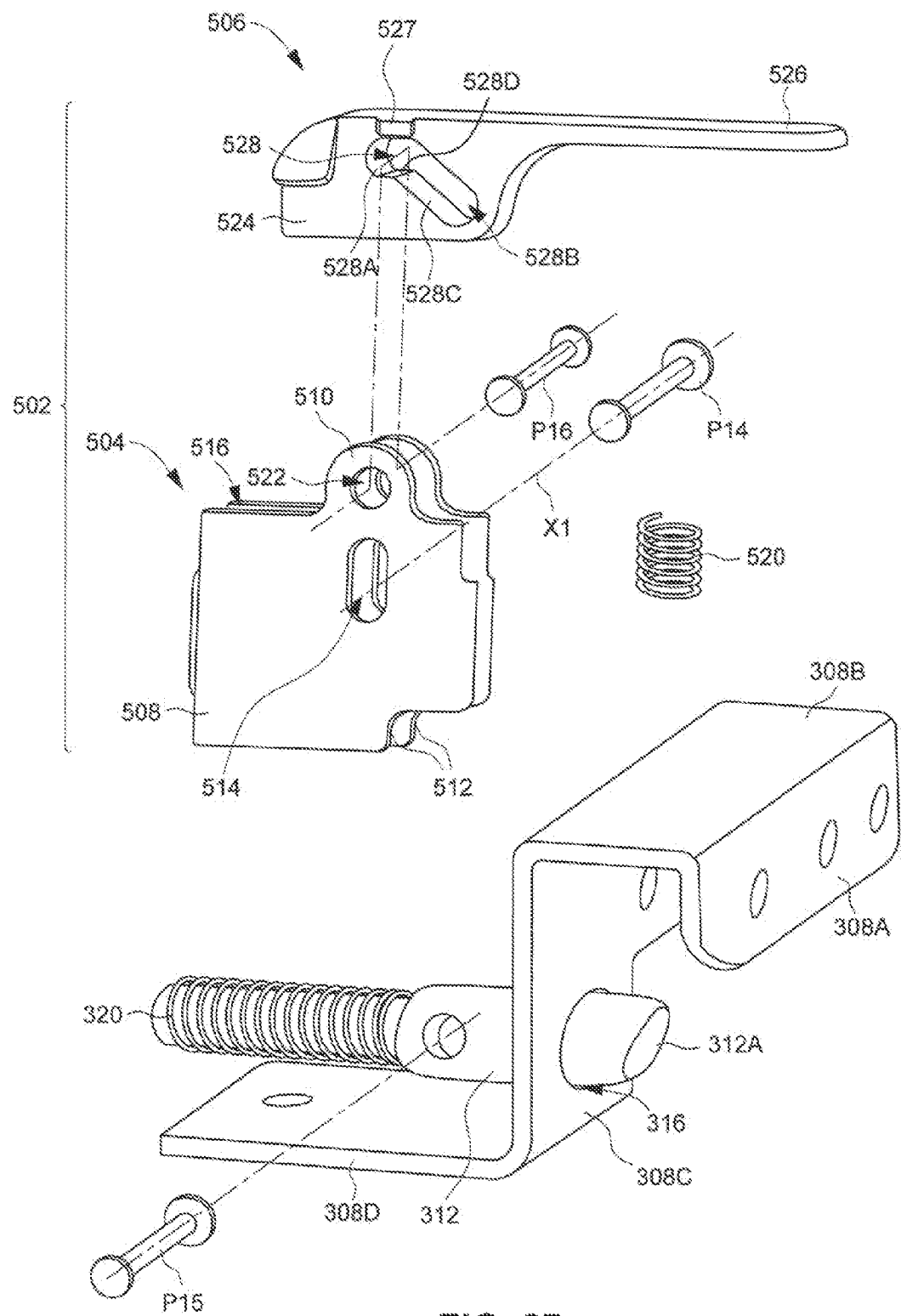
FIG. 27 is an exploded view of the safety lock device shown in FIG. 26.
Figure 28:
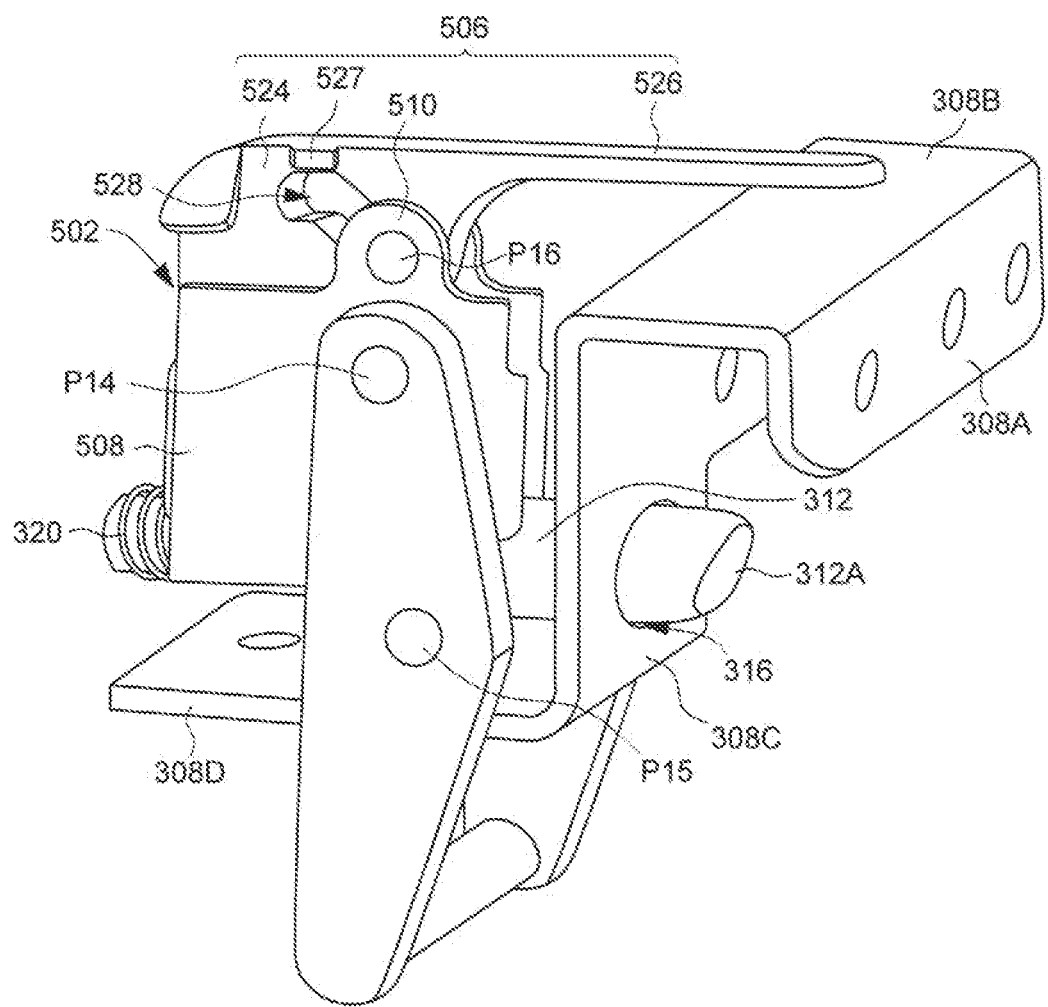
FIG. 28 is a perspective view of the safety lock device shown in FIG. 26.

FIGS. 27 and 28 are respectively exploded and perspective views of the safety lock device 502. The safety lock device 502 can include an arresting part 504 and a release actuator 506. The arresting part 504 can have a hollow body 508 provided with a mount portion 510. A lower portion of the body 508 can form a narrower portion that defines two stop flanges 512 spaced-apart from each other and delimiting a central cavity in which the impeding part 312 can be installed. The body 508 can also include elongated slots 514 that extend vertically and are disposed above the stop flanges 512. The connection shaft P14 defining the rotation axis of the rotary arm 310 can be assembled along the axis X1 passing through the slots 514. A spring 520 can be assembled in the body 508 between the connection shaft P14 and an inner surface of the body 508 located below the connection shaft P14. The mount portion 510 can include two spaced-apart ears that protrude upward from the body 508 and are provided with holes 522. An upper region of the mount portion 510 can also include an inner cavity 516 through which the release actuator 506 can be assembled.

The release actuator 506 can include a coupling portion 524 and a handle 526. The coupling portion 524 and the handle 526 can be formed integrally with the release actuator 506. The coupling portion 524 can be formed with a slot 528 having an upper slot region 528A, a lower slot region 528B, and an intermediate slot region 528C extending at an angle between the upper slot region 528A and the lower slot region 528B. The upper slot region 528A, lower slot region 528B, and intermediate slot region 528C can communicate with one another. The slot 528 can also include a stop surface 528D adjacent to the upper slot region 528A and connected with the intermediate slot region 528C. The handle 526 can extend from the coupling portion 524. The mount portion 510 can be movably assembled with the coupling portion 524 via a connection shaft P16 having a size that fits with the holes 522. The connection shaft P16 can pass through the holes 522 of the mount portion 510 and the slot 528 of the coupling portion 524 to form a sliding link that allows transversal movement of the release actuator 506 relative to the arresting part 504 through the cavity 516, and vertical movement of the arresting part 504 relative to the release actuator 506.

As shown in FIGS. 26 and 27, the handle 526 can have two lateral sides provided with knobs 527, and inner surfaces of the mount portion 510 (in particular, at the two ear parts provided with the holes 522) can respectively have recesses 511 mating with the knobs 527. While the release actuator 506 is operated to unlock the safety lock device 502, the knobs 527 can come into engagement with the recesses 511 to stop the release actuator 506 and hold the arresting part 504 in the unlocking or enabling position for permitting a caregiver to unlock the frame locking structures 306.

Figure 29:
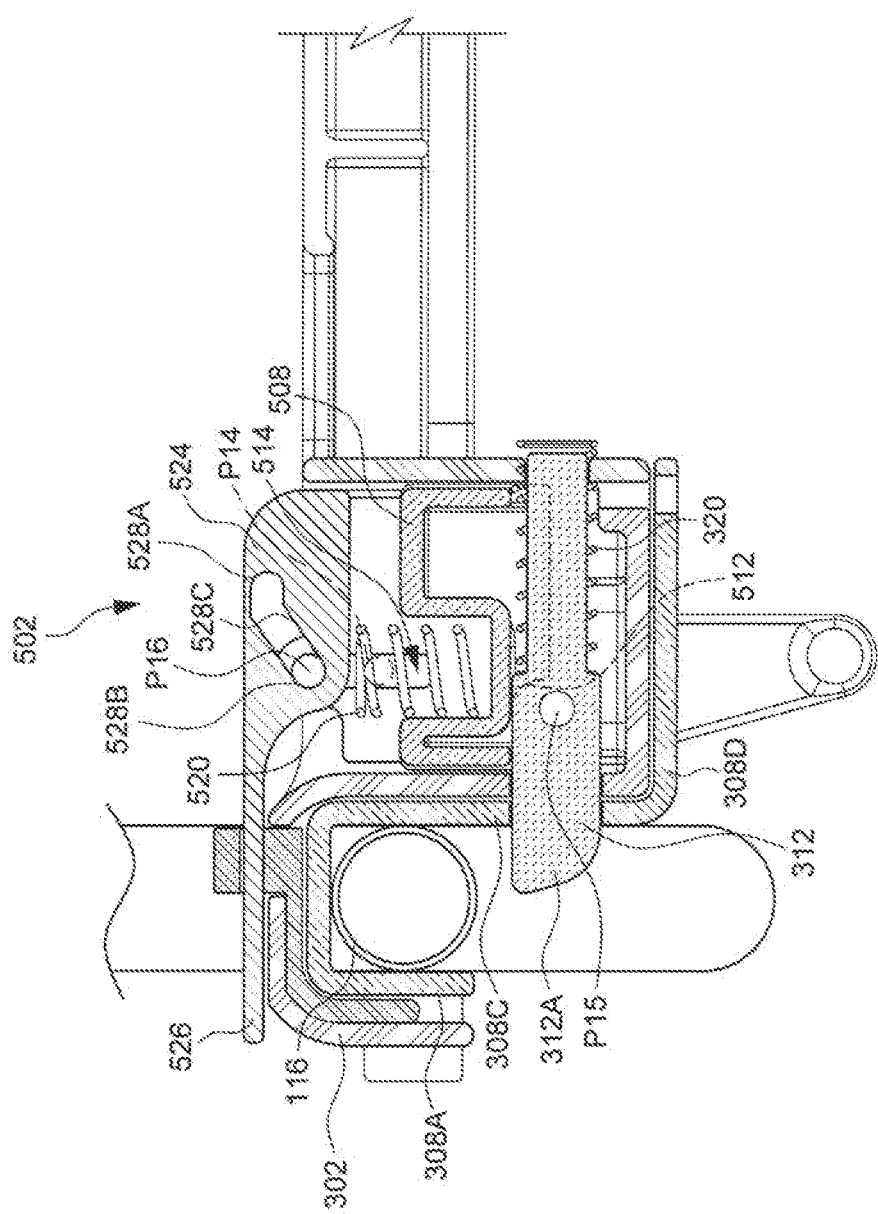
FIG. 29 is a cross-sectional view illustrating the safety lock device of FIG. 26 in a locking or disable state.

FIG. 29 is a cross-sectional view illustrating the safety lock device 502 in the locking or disable state. When the safety lock device 502 is in the locking or disable state, the release actuator 506 can be in a first position where the connection shaft P16 can be positioned in the lower slot region 528B, and the stop flanges 512 can abut against two opposite ends of the connection shaft P15 to block a displacement of the impeding part 312 in a direction that compresses the spring 320 and disengages the end 312A of the impeding part 312 from the underside of the second tube portion 116. Accordingly, even if a caregiver attempts to operate the release actuator 314 of the frame locking structure 306, unlocking displacement of the impeding part 312 is still blocked by the arresting part 504.

Figure 30:
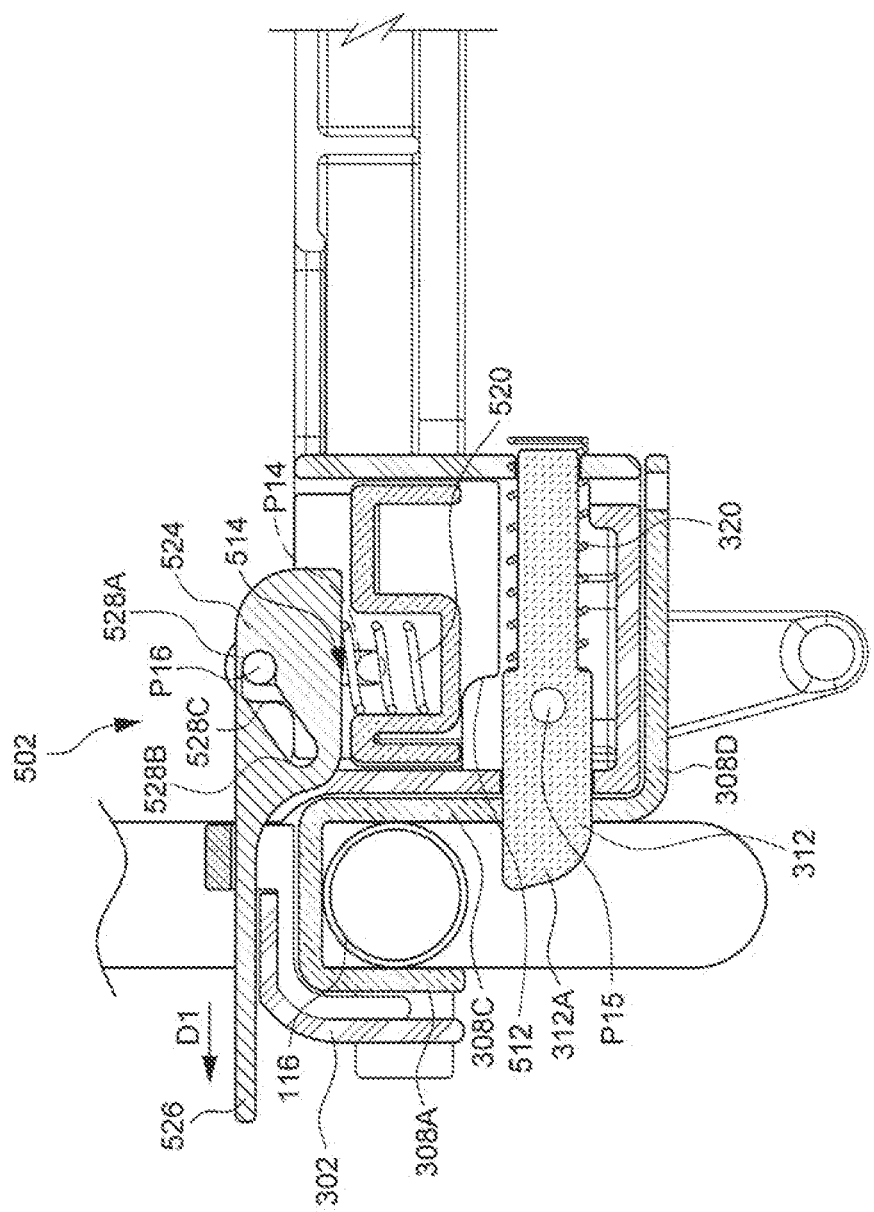
FIG. 30 is a cross-sectional view illustrating the safety lock device of FIG. 26 in an unlocking or enabling state.

FIG. 30 is a cross-sectional view illustrating the safety lock device 502 in the unlocking or enabling state. For switching the safety lock device 502 from the locking or disable state to the unlocking or enabling state, the handle 522 can be operated to pull the release actuator 506 transversally in the direction D1 toward an outside of the seat 302. While the release actuator 506 is moving in the direction D1, the connection shaft P16 can be moved along the intermediate slot region 528C toward the upper slot region 528A, which drives the arresting part 504 to move upward and compresses the spring 520. Once the release actuator 506 reaches the unlocking or enabling position, the connection shaft P16 can be displaced past the stop surface 528D to engage with the upper slot region 528A, and the stop flanges 512 of the arresting part 504 can be disengaged from the connection shaft P15. Once the obstruction created by the arresting part 504 has been removed from the path of displacement of the impeding part 312 in the unlocking direction, the release actuator 314 can be operated to effectively disengage the impeding part 312 from the underside of the side segment 116B of the second tube portion 116. The stroller apparatus 500 then can be collapsed like described previously.

Figure 37:
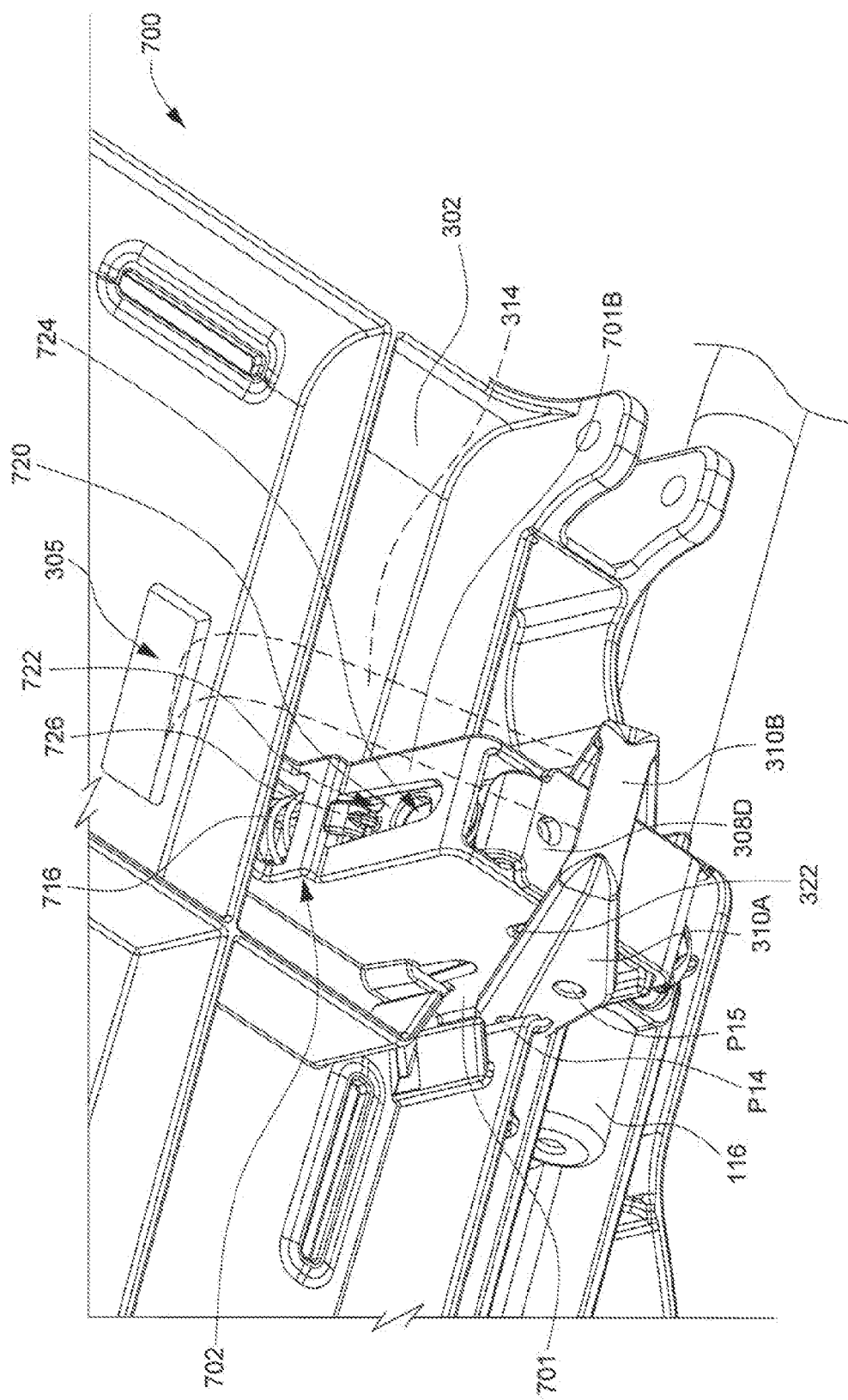
FIG. 37 is a perspective view illustrating another embodiment of a safety lock device provided in a stroller apparatus.

FIG. 37 is a perspective view illustrating another embodiment of a safety lock device 702 provided in a stroller apparatus 700. Like previously described, the stroller apparatus 700 can include a seat 302 installed adjacent to the second tube portion 116. An underside of the seat 302 near the second tube portion 116 can include a bracket 701 where is installed the safety lock device 702. While FIG. 37 shows only one safety lock device 702, it will be readily appreciated that two safety lock devices 702 of similar construction may be provided at the left and right sides of the seat 302. Like previously described, the safety lock device 302 can have a locking or disable state in which it can block unlocking displacement of the impeding part 312 against the driving force applied by the release actuator 314, and an unlocking or enabling state allowing unlocking displacement of the impeding part 312 driven by the release actuator 314.

Figure 38:
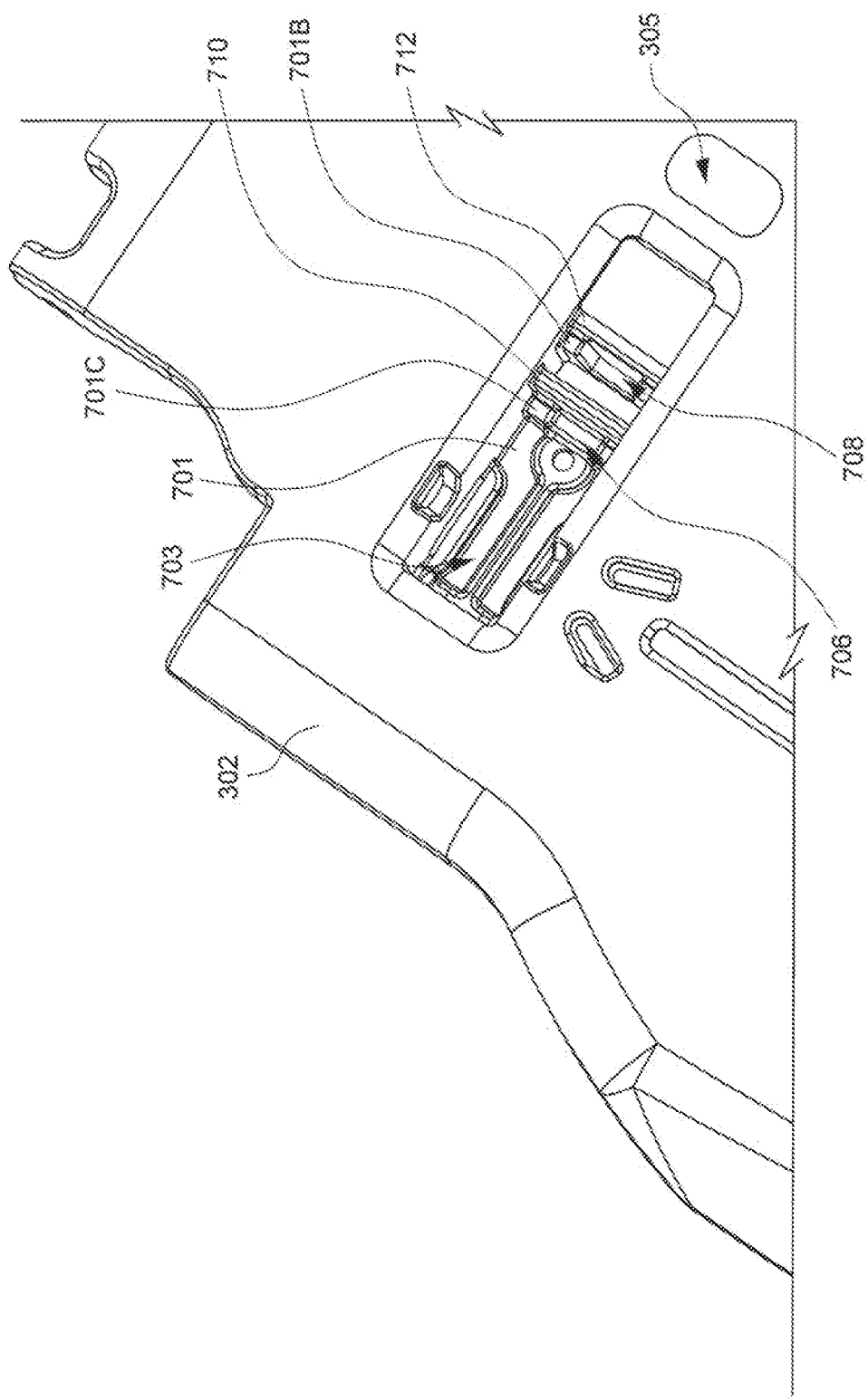
FIG. 38 is a top perspective view illustrating a bracket of the safety lock device shown in FIG. 37 assembled with a seat.

FIG. 38 is a top perspective view illustrating the bracket 701 assembled with the seat 302. The bracket 701 can be affixed with the seat 302 below an opening 703 formed through an upper surface of the seat 302. The bracket 701 can include three parallel sidewalls 701A (better shown in FIG. 40), 701B and 701C spaced apart from one another in a transversal direction of the seat 302, the sidewall 701C being located between the sidewalls 701A and 701B. The sidewalls 701A, 701B and 701C can respectively include a plurality of holes 704, 706 and 708 that are at least partially aligned with one another. Upper ends of the sidewalls 701C and 701B can respectively form rib portions 710 and 712 whose top edges are at a same height.

Figure 39:
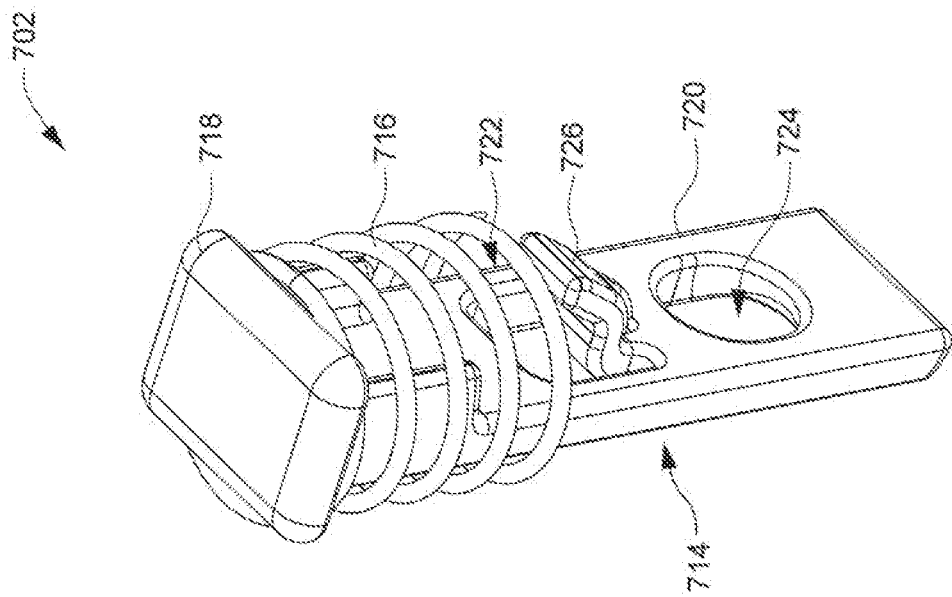
FIG. 39 is a perspective view illustrating the safety lock device shown in FIG. 37.

FIG. 39 is a perspective view of the safety lock device 702. The safety lock device 702 can be installed at a region of the bracket 701 corresponding to the sidewalls 701B and 701C. The safety lock device 702 can include an arresting part 714 and a spring 716. The arresting part 714 can include an actuating portion 718, and an extension 720 projecting downward from the actuating portion 718. The actuating portion 718 can be formed with a button-like shape. The extension 720 can include a slot 722 having a rim from which protrude a resilient tab 726. A lower region of the extension 720 below the slot 722 can include an opening 724.

When the safety lock device 702 is installed in the bracket 701, the arresting part 714 can be movably mounted between the sidewalls 701B and 701C. The sidewall 701B can include an elongated slot in which is received the tab 726. The spring 716 can be wrapped around the sidewalls 701B and 701C, and have two opposite ends respectively connected with an underside of the actuating portion 718 and protruding flanges (not shown) on the sidewalls 701B and 701C.

Figure 40:
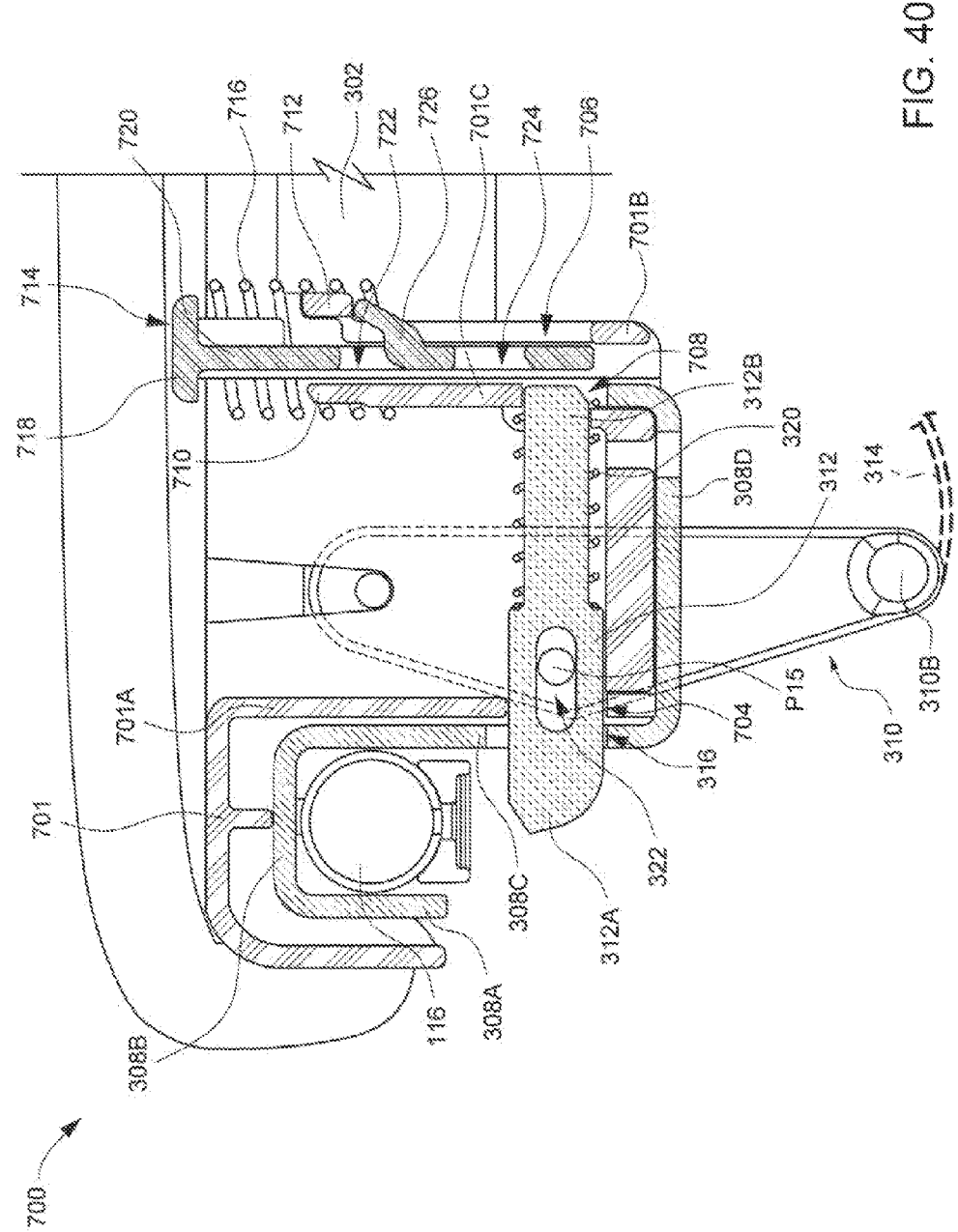
FIG. 40 is a cross-sectional view illustrating the safety lock device of FIG. 37 in a locking or disable state.

FIG. 40 is a cross-sectional view illustrating the safety lock device 702 in the locking or disable state. The spring 716 can bias the arresting part 714 upward to a locking or disable position where the extension 720 can obstruct a passage of the impeding part 312 through the hole 708 of the sidewall 701C toward the sidewall 701B. The abutment of the tab 726 against the rib portion 712 can act against the biasing force of the spring 716 to hold the arresting part 714 in the locking position. Even if the release actuator 314 is inadvertently pulled upward, the arresting part 714 can block a displacement of the impeding part 312 in the direction D2 (better shown in FIG. 41) for disengaging from the underside of the second tube portion 116. Since unlocking of the frame locking structure is disabled, the stroller apparatus can be securely locked in the unfolded state.

Figure 41:
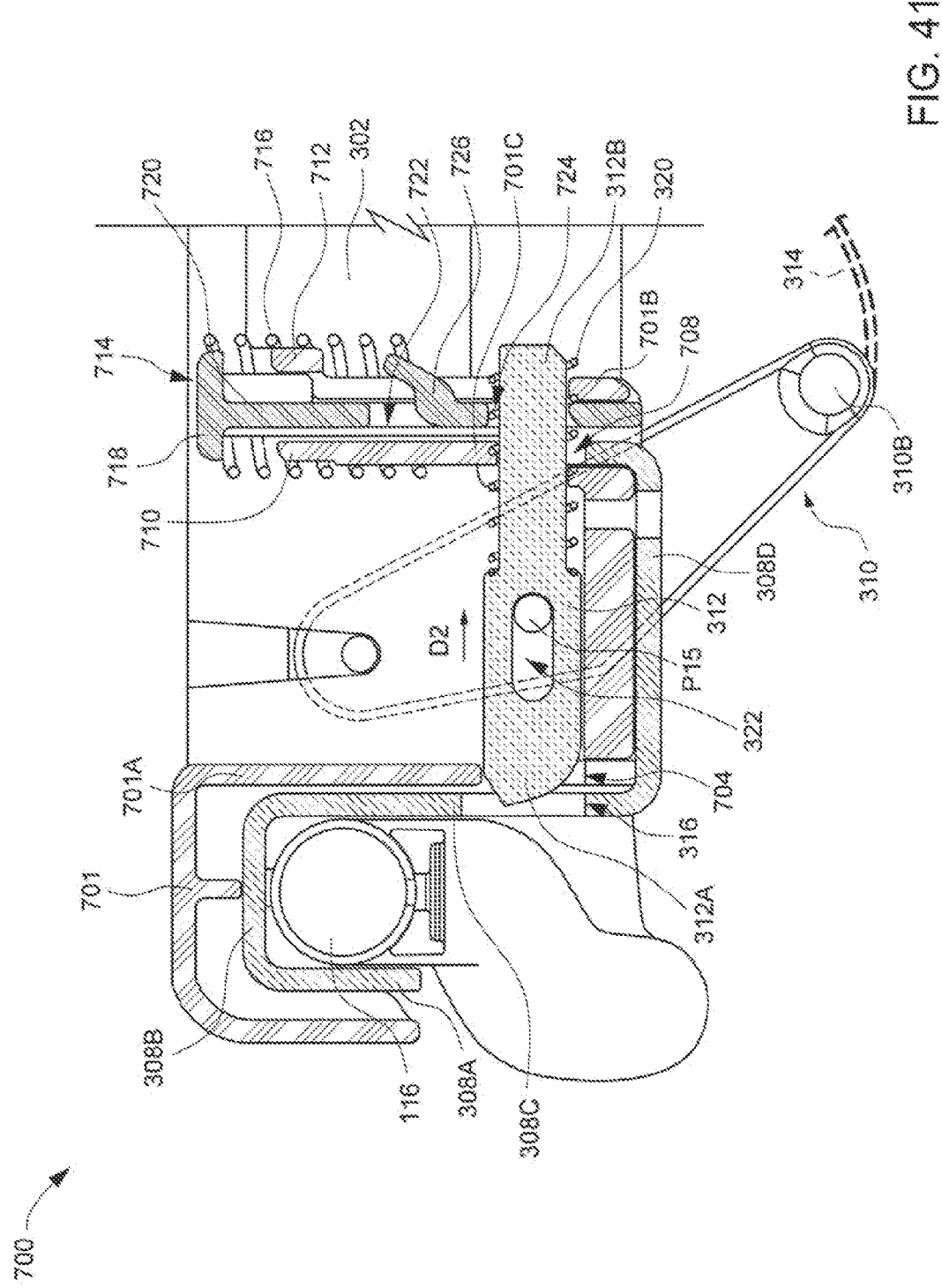
FIG. 41 is a cross-sectional view illustrating the safety lock device of FIG. 37 in an unlocking or enabling state.

FIG. 41 is a cross-sectional view illustrating the safety lock device 702 in the unlocking or enabling state. For switching the safety lock device 702 from the locking or disable state to the unlocking or enabling state, a caregiver can press on the actuating portion 718, which displaces the arresting part 714 downward to an unlocking or enabling position and compresses the spring 716. When the arresting part 714 reaches the unlocking or enabling position, the opening 724 can be substantially aligned with the path of displacement of the impeding part 312 in the direction D2 that passes the hole 708 of the sidewall 701C and the hole 706 of the sidewall 701B. As a result, the passage of the impeding part 312 through the hole 708 toward the sidewall 701B can be cleared.

Once the obstruction formed by the arresting part 714 has been removed from the path of displacement of the impeding part 312 in the unlocking direction, the release actuator 314 can be pulled upward so as to drive displacement of the impeding part 312 in the direction D2 to disengage from the underside of the second tube portion 116. While it is moving in the direction D2, the impeding part 312 can successively travel through the hole 708 of the sidewall 701C, the opening 724 of the arresting part 714 and the hole 706 of the sidewall 701B. Once the frame locking structures are unlocked, the stroller apparatus can be collapsed as described previously.

It will be appreciated that the frame locking structures and safety lock devices described previously may be applied to different types of products, and are not limited to stroller apparatuses. Examples of applications other than stroller apparatuses are described hereafter with reference to FIGS. 31-42.

Figure 31:
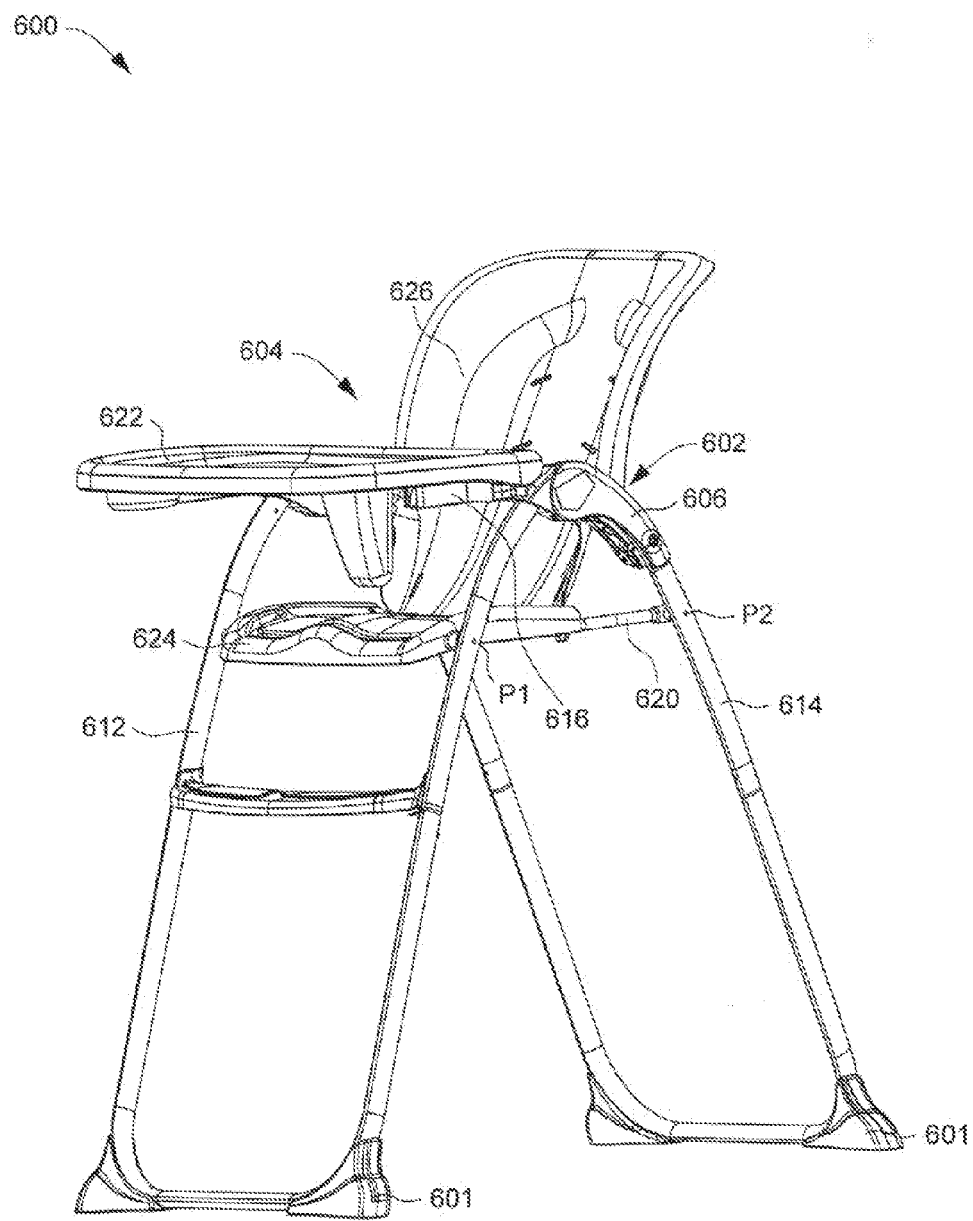
FIG. 31 is a perspective view illustrating an embodiment of a collapsible high chair apparatus.
Figure 32:
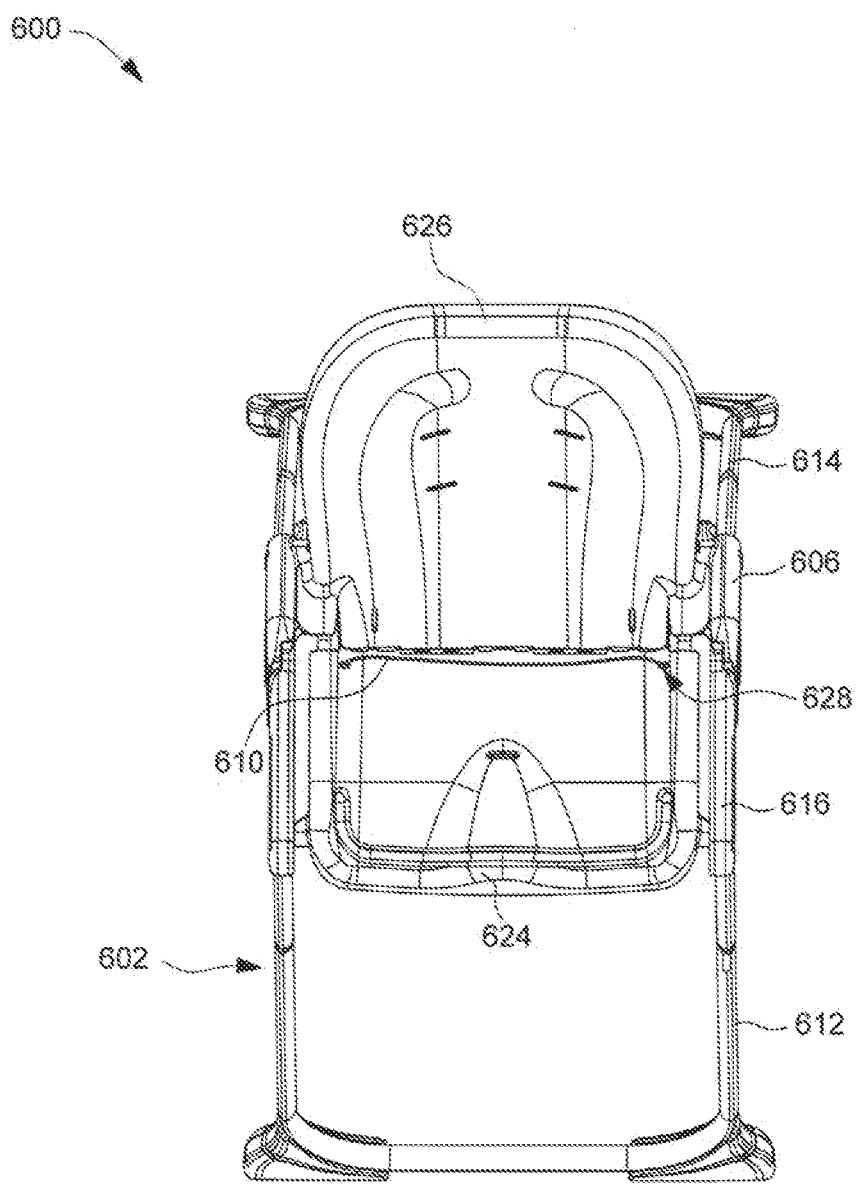
FIGS. 32 and 33 are respectively top and bottom views of the high chair apparatus.
Figure 33:
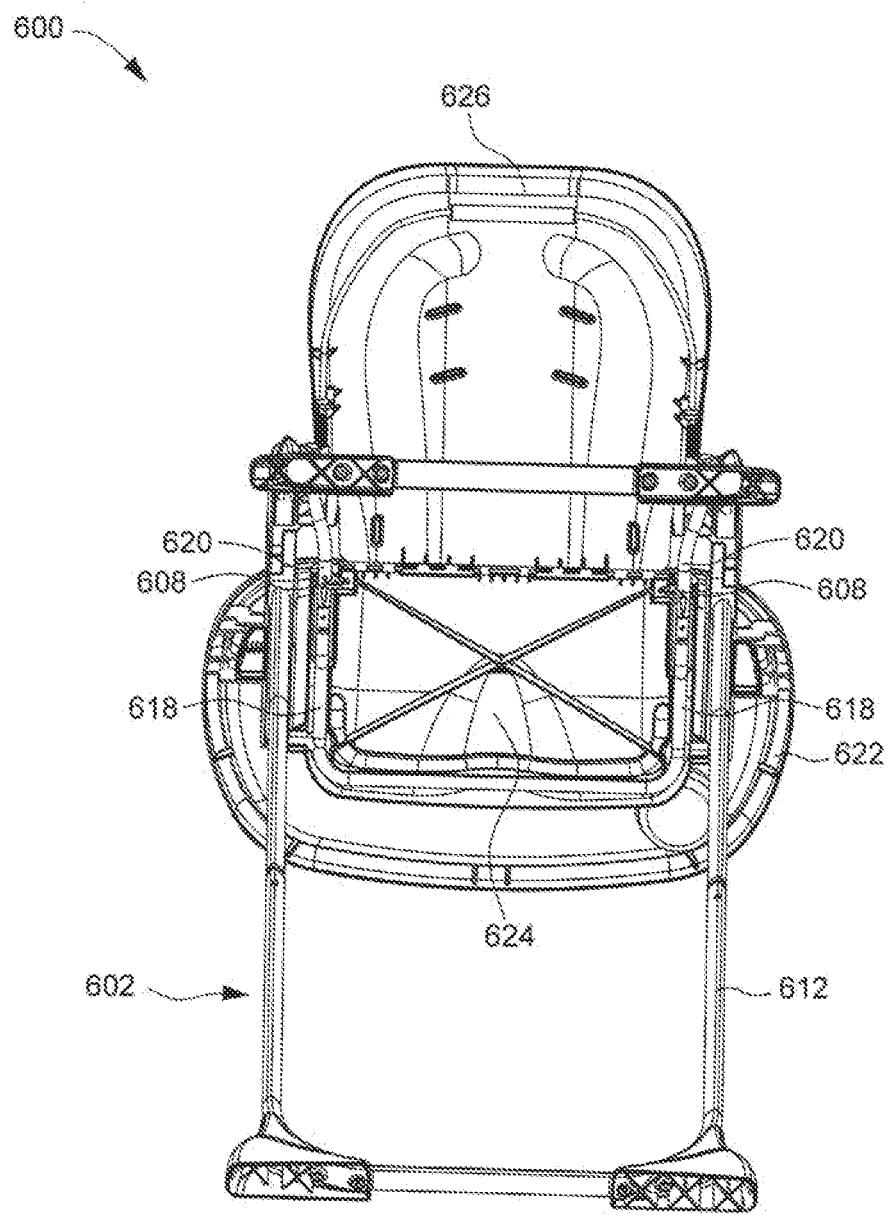

FIG. 31 is a perspective view illustrating a collapsible high chair apparatus 600, and FIGS. 32 and 33 are respectively top and bottom views of the high chair apparatus 600. The high chair apparatus 600 may be used for seating a young child. The high chair apparatus 600 can include a support frame 602 with which is assembled a seat 604. The support frame 602 may be provided with coupling brackets 606 and frame locking structures 608, which can be respectively arranged at the left and right sides of the support frame 602 in a symmetric manner. A release actuator 610 can be operatively connected with the frame locking structures 608. The release actuator 610 may be operable to switch the frame locking structures 608 from a locking state where the support frame 602 is locked in the unfolded state, to an unlocking state allowing the support frame 602 to fold to the collapse state.

The support frame 602 can include a first leg frame 612, a second leg frame 614, two armrests 616, and a seat frame comprised of first tube portions 618 and second tube portions 620. Both of the first and second leg frames 612 and 614 can exemplary have a U-shape. The first leg frame 612 can have upper ends respectively affixed with the armrests 616. The coupling brackets 606 can be respectively affixed with upper ends of the second leg frame 614, and pivotally connected with rear ends of the armrests 616. The connection through the coupling brackets 606 allows to pivotally fold and unfold the first leg frame 612 and the armrests 616 relative to the second leg frame 614. Lower ends of the first and second leg frames 612 and 614 can be provided with anti-slip pads 601.

A pair of the first and second tube portions 618 and 620 can be respectively arranged at the left and right sides of the support frame 602, the first tube portions 618 being disposed in front of and at least partially aligned with the second tube portions 620. At each of the left and right sides, the first tube portion 618 can be pivotally connected with a side segment of the first leg frame 612 via a connection shaft P1 located below the armrest 616, and the second tube portion 620 can be pivotally connected with a side segment of the second leg frame 614 via a connection shaft P2 also located below the armrest 616.

The seat 604 can include sitting portion 624 and a seatback 626. An upper surface of the sitting portion 624 can include openings 628 respectively disposed at left and right side regions. The release actuator 610 can extend transversally above the upper surface of the sitting portion 624, and pass through the openings 628 to respectively connect with the frame locking structures 608.

The high chair apparatus 600 can also include a tray 622 that may be removably attached with the armrests 616 above the sitting portion 624 and in front of the seatback 626.

Figure 34:
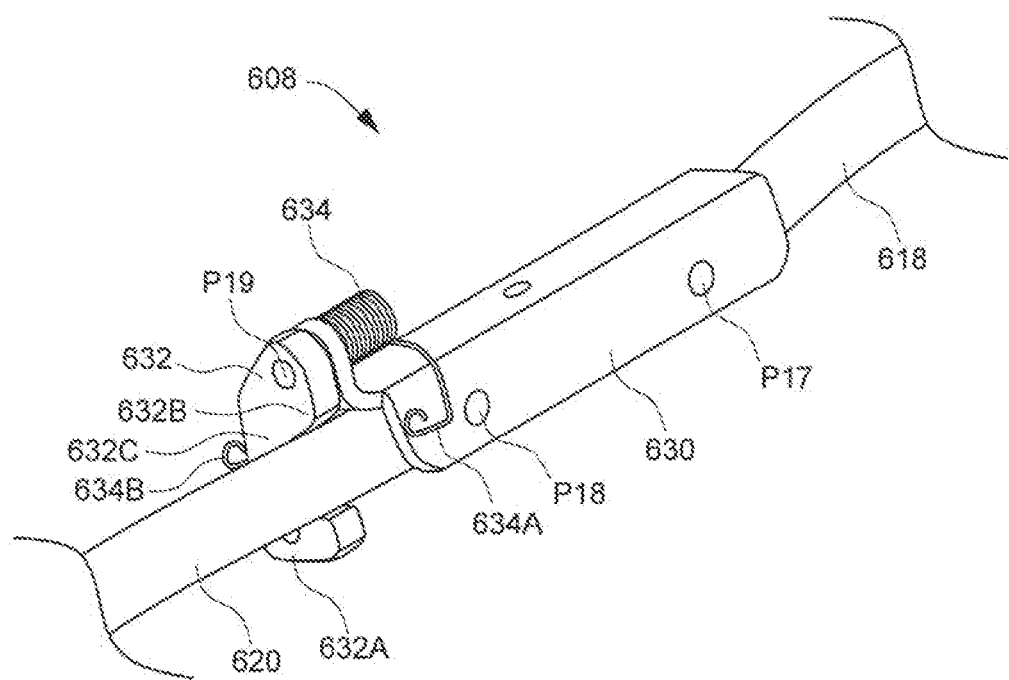
FIG. 34 is a schematic view illustrating one of two frame locking structures implemented in the high chair apparatus in a locking state.

The two frame locking structures 608 can be assembled with the first and second tube portions 618 and 620 at the left and right sides of the support frame 602. FIG. 34 is a schematic view illustrating one of the two frame locking structures 608 in the locking state. The two frame locking structures 608 may be similar in construction, each including a joint housing 630, an impeding part 632 and a torsion spring 634. The joint housing 630 can be affixed with an underside of the sitting portion 624, and have a U-shape. An end of the first tube portion 618 can be received in the joint housing 630, and can be pivotally connected with the joint housing 630 via a connection shaft P17. An end of the second tube portion 620 can be received in the joint housing 630, and can be pivotally connected with the joint housing 630 via a connection shaft P18.

The impeding part 632 can be assembled with the joint housing 630 adjacently to the second tube portion 620, and extend from an upper side to an underside of the second tube portion 620. The impeding part 632 can be formed in an integral body including a catch portion 632A, a mount portion 632B, and an intermediate portion 632C connected between the catch portion 632A and the mount portion 632B. The mount portion 632B of the impeding part 632 can be pivotally connected with the joint housing 630 via a connection shaft P19. The connection shaft P19 can be located above the connection shaft P18 and the connection shaft P17, and can define a pivot axis extending generally in the same direction as the second tube portion 620. The catch portion 632A can be connected with an end of the release actuator 610.

The torsion spring 634 can be mounted around the connection shaft P19, and include first and second ends 634A and 634B respectively connected with the joint housing 630 and the impeding part 632.

When the frame locking structure 608 is in the locking state, the catch portion 632A can wrap around the underside of the second tube portion 620 so as to block rotation of the second tube portion 620. Accordingly, the high chair apparatus 600 can be securely held in the unfolded state as shown in FIG. 31.

Figure 35:
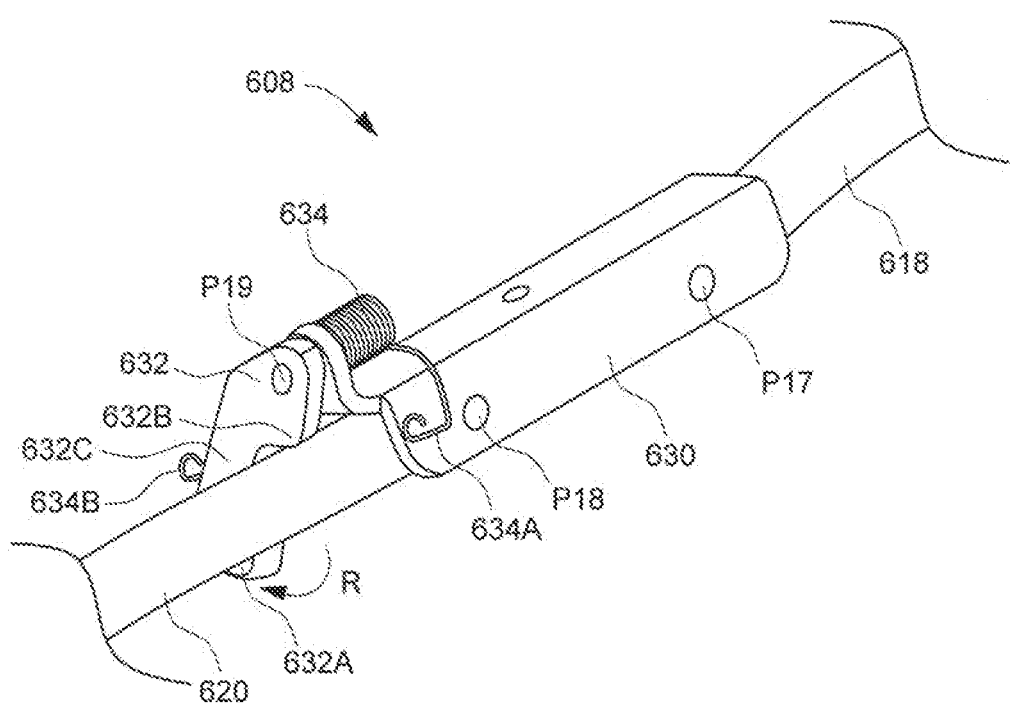
FIG. 35 is a schematic view illustrating the frame locking structure of FIG. 34 in the unlocking state.

FIG. 35 is a schematic view illustrating the frame locking structure 608 in the unlocking state. The release actuator 610 (better shown in FIG. 32) can be pulled upward, which can drive the impeding part 632 to rotate (e.g., clockwise direction R in FIG. 35) so as to disengage the catch portion 632A from the underside of the second tube portion 620. The two frame locking structures 608 can be thereby switched concurrently to the unlocking state to allow folding of the high chair apparatus 600.

Figure 36:
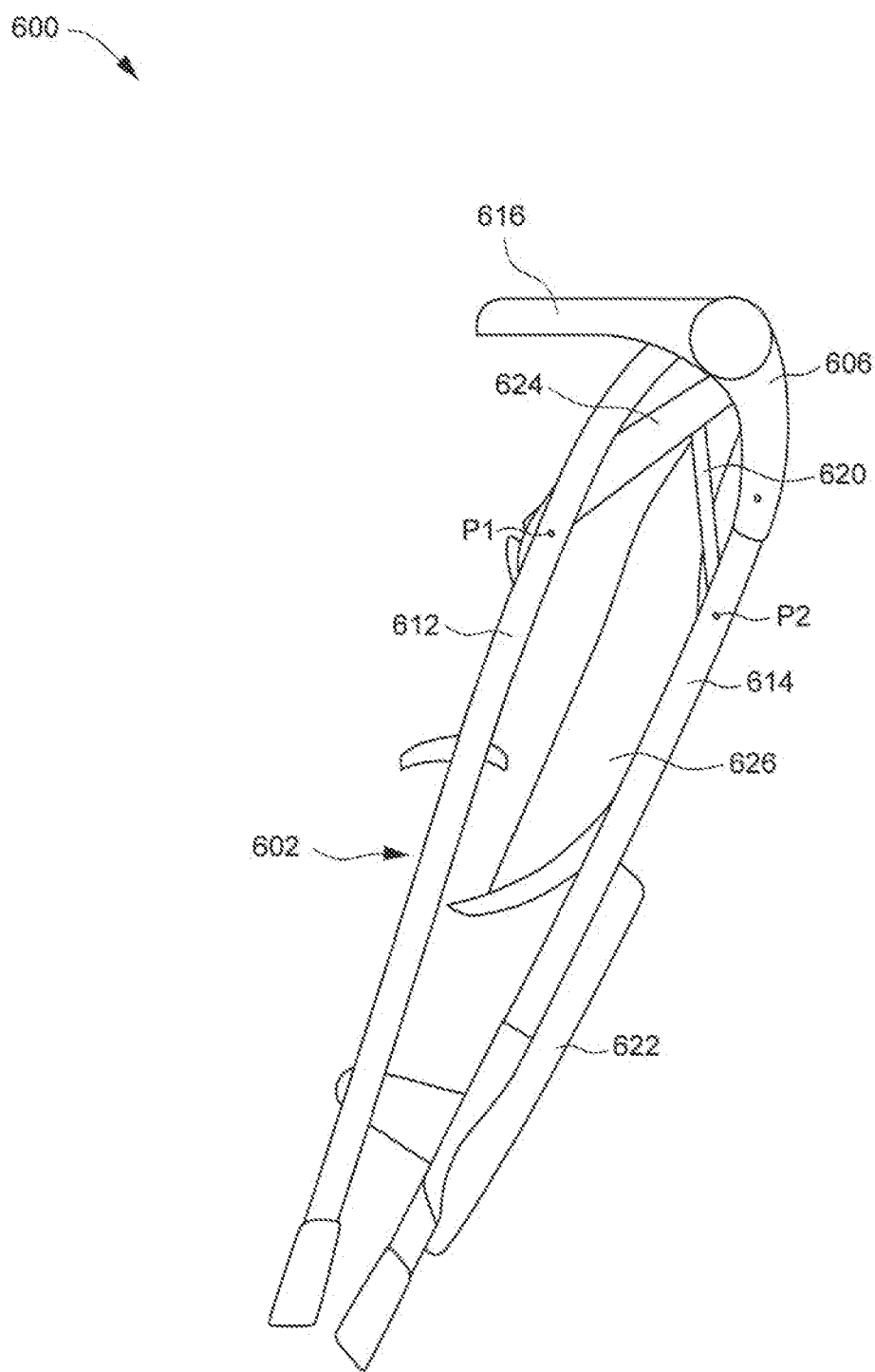
FIG. 36 is a schematic view illustrating the high chair apparatus of FIG. 31 folded to a collapse state.

FIG. 36 is a schematic view illustrating the high chair apparatus 600 folded to the collapse state. While the release actuator 610 is pulled upward, the high chair apparatus 600 can be raised above the ground. Once the frame locking structures 608 are turned to the unlocking state, the first leg frame 612 and the second leg frame 614 can accordingly fold toward each other under gravity action. While they are folding onto each other, the first and second leg frames 612 and 614 can drive rotation of the second tube portions 620 relative to the first tube portions 618 and the seat 604. Accordingly, the first and second tube portions 618 and 620 can also folded onto each other, the first tube portions 618 and the seat 604 rotating in the same direction as the first leg frame 612, and the second tube portions 620 rotating in the same direction as the second leg frame 614.

Figure 42:
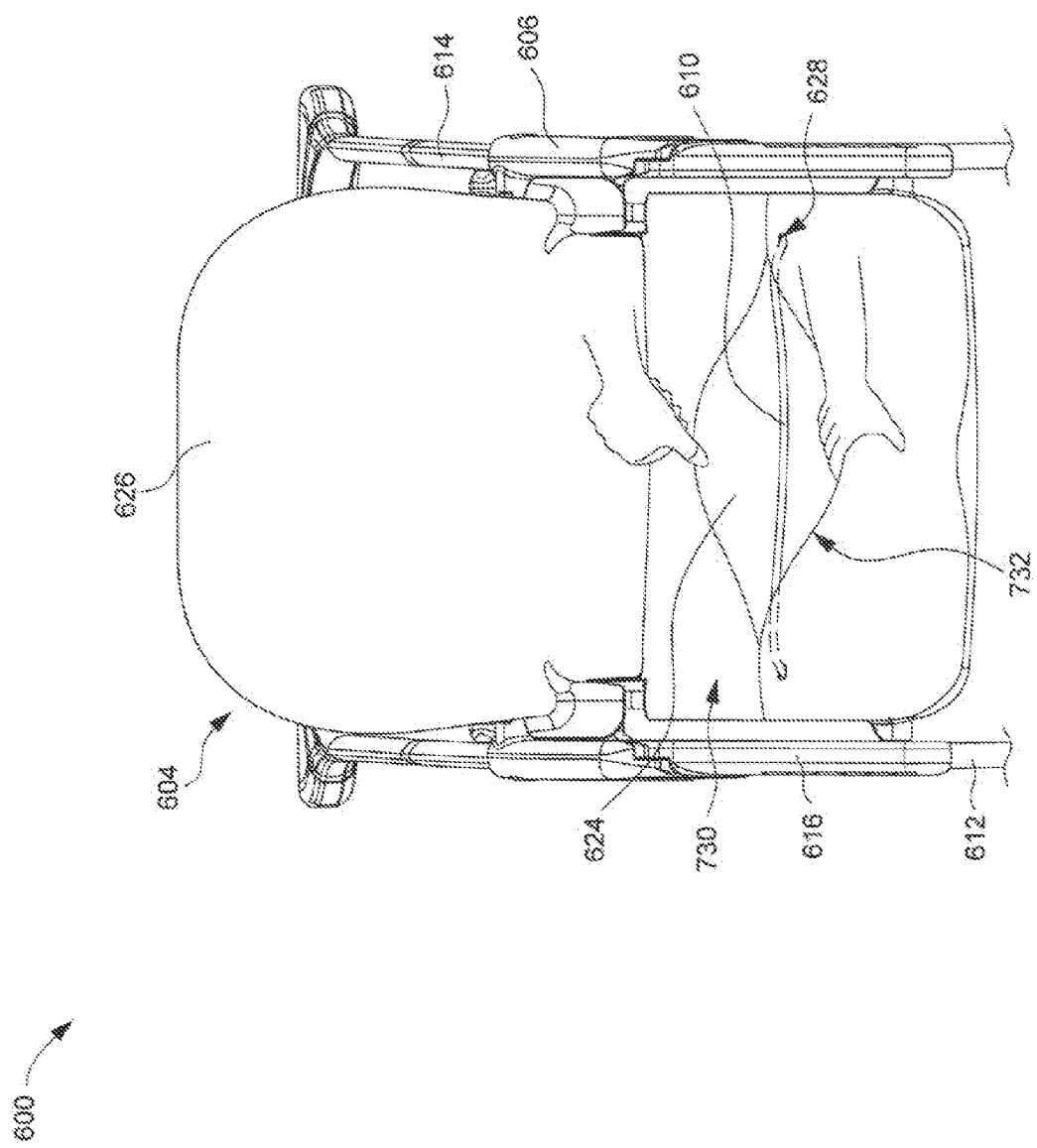
FIG. 42 is a schematic view illustrating an embodiment of a high chair apparatus provided with a cover.

FIG. 42 is a schematic view illustrating a variant embodiment of the high chair apparatus 600 provided with a cover 730. The cover 730 can be made of a soft material, e.g., fabric, and can wrap at least partially the sitting portion 624 of the seat 604 and the release actuator 610. The cover 730 can include an opening 732 through which the release actuator 610 may be accessible. When the high chair apparatus 600 is used in the unfolded state, the release actuator 610 can be concealed under the cover 730. Accordingly, accidental collapse of the high chair apparatus 600 owing to inadvertent operation of the release actuator 610 can be prevented. The release actuator 610 can be accessed via the opening 732, and then can be pulled upward as described previously to collapse the high chair apparatus 600. While it has been described, it is worth noting that the cover 730 can also be used with the seats of the stroller apparatus embodiments.

At least one advantage of the child carrier apparatuses described herein is the ability to conveniently unlock frame locking structures assembled with a seat frame. The frame locking structures can be connected with a release actuator that extends across a width of the seat portion in the child carrier apparatus. The release actuator can be pulled upward to unlock the frame locking structures and trigger self-folding of the child carrier apparatus into the collapse state. The manipulation for folding the child carrier apparatus is simple to carry out, and reduces the risk of injuries caused by clamping of the caregiver's hand in the support frame of the child carrier apparatus.

In addition, safety lock devices can also be provided in association with the frame locking structures. The safety lock device can have a locking or disable state in which unlocking of the associated frame locking structure is prevented, and an unlocking or enabling state in which unlocking of the associated frame locking structure is enabled. Accidental collapse of the child carrier apparatus induced by inadvertent operation of the release actuator can be thereby prevented.

Realizations of the child carrier apparatuses have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the inventions as defined in the claims that follow.

What is claimed is:

1. A collapsible child carrier apparatus comprising:
   a first and a second leg frame;
   a seat frame assembled with the first and second leg frames, the seat frame including a first tube portion pivotally connected with the first leg frame, and a second tube portion pivotally connected with the second leg frame;
   a joint housing connected with the first and second tube portions, wherein the second tube portion is pivotally connected with the joint housing, the second tube portion being rotatable relative to the joint housing between an unfolded position and a folded position;
   an impeding part assembled adjacent to the joint housing, wherein the impeding part is movable between a first position where the impeding part obstructs rotation of the second tube portion relative to the joint housing from the unfolded position, and a second position where the impeding part is displaced away from a path of rotation of the second tube portion relative to the joint housing and the first tube portion to allow folding of the second tube portion;
   a seat affixed with the first tube portion, an underside of the seat having a bracket where the impeding part is assembled, the impeding part being movable through the bracket transversally relative to the child carrier apparatus; and
   a release actuator operable to drive the impeding part to move from the first position to the second position.

2. The child carrier apparatus according to claim 1, wherein the impeding part is biased toward the first position by a spring force.

3. The child carrier apparatus according to claim 1, wherein parts of the first and second tube portions adjacent to the joint housing are substantially aligned and parallel to each other when the second tube portion is in the unfolded position.

4. The child carrier apparatus according to claim 1, wherein the first tube portion is affixed with the joint housing.

5. The child carrier apparatus according to claim 1, further including a rotary arm pivotally connected with the bracket, the release actuator being connected with the rotary arm, the bracket having an elongated slot along which a connection shaft respectively connecting with the rotary arm and the impeding part is guided for displacement.

6. The child carrier apparatus according to claim 1, further including an arresting part assembled with the bracket, the arresting part being movable between a locking position where the arresting part forms an obstruction that blocks displacement of the impeding part from the first position to the second position, and an unlocking position where the obstruction formed by the arresting part is removed from a path of displacement of the impeding part from the first position toward the second position.

7. The child carrier apparatus according to claim 6, wherein the arresting part has an opening, the arresting part when in the unlocking position has the opening substantially aligned with the path of displacement of the impeding part from the first position toward the second position.

8. The child carrier apparatus according to claim 6, wherein the arresting part is biased by a spring force toward the locking position.

9. The child carrier apparatus according to claim 6, further including a second release actuator assembled with the arresting part, the second release actuator being operable to drive the arresting part in movement between the locking position and the unlocking position.

10. The child carrier apparatus according to claim 9, wherein the arresting part has a sleeve portion, and the second release actuator has a coupling portion pivotally assembled with the sleeve portion and a cam surface that rests in contact with the seat, the second release actuator being operable to rotate relative to the seat about a pivot axis, and the second release actuator and the arresting part being mutually linked in displacement along the pivot axis via a connection shaft assembled at the sleeve portion and the coupling portion.

11. The child carrier apparatus according to claim 10, wherein the seat has a raised portion, and the second release actuator is adapted to engage with the raised portion to hold the arresting part in the unlocking position.

12. The child carrier apparatus according to claim 9, wherein the second leg frame drives the second release actuator in rotation to cause the arresting part to recover the locking position, when the child carrier apparatus is folded.

13. The child carrier apparatus according to claim 9, wherein the second release actuator is mounted with the seat for transversal movement relative to the seat, the second release actuator having a slot through which a connection shaft mounted with the arresting part is movably assembled, whereby a transversal movement of the second release actuator relative to the seat drives displacement of the arresting part between the locking position and the unlocking position.

14. The child carrier apparatus according to claim 13, wherein the arresting part has a mount portion, and the release actuator has a knob that is adapted to engage with the mount portion to hold the arresting part in the unlocking position.

15. The child carrier apparatus according to claim 1, wherein folding of the child carrier apparatus causes the first leg frame and the first tube portion to rotate in a same first direction, and the second leg frame and the second tube portion to rotate in a same second direction opposite the first direction toward the first leg frame and the first tube portion.

16. The child carrier apparatus according to claim 1, wherein the release actuator is formed by a strap extending across a width of the seat.

17. The child carrier apparatus according to claim 16, further including a cover made of a fabric material that wraps at least partially the seat and the release actuator, the cover having an opening through which the release actuator is accessible for operation.

18. The child carrier apparatus according to claim 1, being implemented as a stroller apparatus further including a handle, and an armrest having a transversal portion and a side segment, the second leg frame and the handle being respectively connected pivotally with the side segment, and the first leg frame being affixed with the side segment.

19. The child carrier apparatus according to claim 18, further including a linkage structure comprised of a rod segment having a first and a second end portion, the first end portion of the rod segment being pivotally connected with the handle, and the second end portion of the rod segment being pivotally connected with the second tube portion.

20. The child carrier apparatus according to claim 19, wherein the second tube portion is affixed with a holding bracket configured to keep a backrest at different inclinations, and the second end portion of the rod segment is pivotally connected with the holding bracket.

21. The child carrier apparatus according to claim 1, being implemented as a high chair apparatus.

22. A collapsible child carrier apparatus comprising:
a first and a second leg frame, the first and second leg frame being rotatable toward each other to collapse the child carrier apparatus, and away from each other to unfold the child carrier apparatus;
a seat frame assembled with the first and second leg frames, the seat frame including a first seat frame segment pivotally connected with the first leg frame, and a second seat frame segment pivotally connected with the second leg frame, the first and second seat frame segments being further pivotally coupled with each other, the second seat frame segment being rotatable relative to the first seat frame segment between an unfolded state and a folded state, the first and second seat frame segments when in the unfolded state keeping the first and second leg frames deployed from each other, and a displacement of the first and second seat frame segments from the unfolded state toward the folded state being linked with a collapse of the first and second leg frames toward each other;
a seat for receiving a child and affixed adjacently with one of the first and second seat frame segment;
an impeding part movable between a first position where the impeding part obstructs rotation of the second seat frame segment relative to the first seat frame segment so as to lock the first and second seat frame segments in the unfolded state, and a second position where rotation of the second seat frame segment relative to the first seat frame segment toward the folded state is allowed for collapsing the child carrier apparatus; and
a release actuator operable to drive the impeding part to move from the first position to the second position.

23. The child carrier apparatus according to claim 22, wherein the impeding part is biased toward the first position by a spring force.

24. The child carrier apparatus according to claim 22, wherein the first and second seat frame segments are respectively assembled with a joint housing, the second seat frame segment being pivotally connected with the joint housing.

25. The child carrier apparatus according to claim 22, wherein the impeding part is pivotally assembled around the second seat frame portion.

26. The child carrier apparatus according to claim 22, wherein the seat is affixed with the first seat frame segment, an underside of the seat having a bracket where the impeding part is assembled, the impeding part being movable through the bracket transversally relative to the child carrier apparatus.

27. The child carrier apparatus according to claim 26, further including a rotary arm pivotally connected with the bracket, the release actuator being connected with the rotary arm, the rotary arm and the impeding part being respectively connected with a connection shaft, and the bracket having an elongated slot along which the connection shaft is guided for displacement.

28. The child carrier apparatus according to claim 26, further including an arresting part assembled with the bracket, the arresting part being movable between a locking position where the arresting part forms an obstruction that blocks displacement of the impeding part from the first position to the second position, and an unlocking position where the obstruction formed by the arresting part is removed from a path of displacement of the impeding part from the first position toward the second position.

29. The child carrier apparatus according to claim 28, wherein the arresting part has an opening, the arresting part when in the unlocking position has the opening substantially aligned with the path of displacement of the impeding part from the first position toward the second position.

30. The child carrier apparatus according to claim 22, being implemented as a stroller apparatus or a high chair apparatus.

31. The child carrier apparatus according to claim 22, being implemented as a stroller apparatus that further includes:
a handle;
an armrest having a transversal portion and a side segment, the second leg frame and the handle being respectively connected pivotally with the side segment, and the first leg frame being affixed with the side segment; and
a linkage structure including a rod segment, and a linkage plate having a triangular shape, the rod segment being pivotally connected with the handle, the linkage plate being affixed with the second seat frame segment and pivotally connected with the rod segment and the second leg frame.

32. A collapsible child carrier apparatus comprising:
a first and a second leg frame, the first and second leg frame being rotatable toward each other to collapse the child carrier apparatus, and away from each other to unfold the child carrier apparatus;
a first and a second side segment assembled with each other, the first side segment being pivotally connected with the first leg frame, and the second side segment being pivotally connected with the second leg frame, the second side segment being rotatable relative to the first side segment between an unfolded state and a folded state, the first and second side segments when in the unfolded state keeping the first and second leg frames deployed from each other, and a displacement of the first and second side segments from the unfolded state toward the folded state being linked with a collapse of the first and second leg frames toward each other, a pivot axis about which the second side segment rotates relative to the first side segment being located between the first and second leg frames;
a seat for receiving a child and affixed with one of the first and second side segment;
an impeding part arranged near the first and second side segments, the impeding part being movable between an engaged position where the impeding part locks the unfolded state, and a disengaged position where rotation of the second side segment relative to the first side segment toward the folded state is allowed for collapsing the child carrier apparatus; and
a release actuator operable to drive the impeding part to move from the engaged position to the disengaged position.

33. The child carrier apparatus according to claim 32, wherein the impeding part is pivotally assembled around the second side segment.

34. The child carrier apparatus according to claim 32, wherein the impeding part is pivotally connected with a joint housing that is arranged adjacent to the first and second side segments.

35. The child carrier apparatus according to claim 32, wherein the impeding part is biased toward the engaged position by a spring force.

36. The child carrier apparatus according to claim 32, wherein the seat is affixed with the first side segment, an underside of the seat having a bracket where the impeding part is assembled, the impeding part being movable through the bracket transversally relative to the child carrier apparatus.

37. The child carrier apparatus according to claim 32, wherein the first side segment is affixed with a joint housing that is arranged adjacent to the first and second side segment, the joint housing having a sidewall provided with an opening through which the impeding part inserts when in the engaged position.

38. The child carrier apparatus according to claim 32, wherein the seat is affixed with the first side segment, a bracket and a rotary arm pivotally connected with each other extending at an underside of the seat, the release actuator being connected with the rotary arm, the bracket having an elongated slot along which a connection shaft respectively connecting with the rotary arm and the impeding part is guided for movement.

39. The child carrier apparatus according to claim 32, wherein the release actuator is formed by a strap extending across a width of the seat.

40. The child carrier apparatus according to claim 32, being implemented as a stroller apparatus or a high chair apparatus.

* * * * *